United States Patent
Poss et al.

(10) Patent No.: US 7,481,159 B2
(45) Date of Patent: *Jan. 27, 2009

(54) SOLAR POWERED COMPACTION APPARATUS

(75) Inventors: James Poss, Somerville, MA (US);
Jeffrey Satwicz, Auburndale, MA (US);
Bret Richmond, Needham, MA (US);
Mikell Taylor, Needham, MA (US)

(73) Assignee: Seahorse Power Company, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,822

(22) Filed: Oct. 23, 2006

(65) Prior Publication Data

US 2007/0101875 A1    May 10, 2007

Related U.S. Application Data

(63) Continuation-in-part of application No. 10/864,566, filed on Jun. 9, 2004, now Pat. No. 7,124,680.

(60) Provisional application No. 60/476,832, filed on Jun. 9, 2003.

(51) Int. Cl.
*B30B 9/30* (2006.01)
*B30B 15/14* (2006.01)

(52) U.S. Cl. ............... 100/48; 100/99; 100/345; 100/221; 100/229 A; 100/233; 100/237

(58) Field of Classification Search ............ 100/48, 100/49, 99, 102, 214, 215, 226, 229 A, 233, 100/237, 269.01, 270, 345
See application file for complete search history.

(56) References Cited

U.S. PATENT DOCUMENTS

| | | | |
|---|---|---|---|
| 4,147,100 A | 4/1979 | Dykstra | 100/48 |
| 4,188,872 A | 2/1980 | Chrablow | 100/343 |
| 4,827,645 A | 5/1989 | Stamps, Jr. | 40/567 |
| 5,222,853 A | 6/1993 | Carson | 414/408 |
| 5,415,264 A | 5/1995 | Menoud | 194/217 |
| 5,690,025 A | 11/1997 | Hawkins | 100/35 |
| 5,713,270 A * | 2/1998 | Fitzgerald et al. | 100/49 |
| 5,829,349 A | 11/1998 | Fitzgerald et al. | 100/102 |
| 5,967,355 A | 10/1999 | Ragot | 220/4.32 |
| 6,000,323 A | 12/1999 | Schlegel | 100/35 |
| 6,367,377 B1 | 4/2002 | Gawley et al. | 100/49 |
| 6,543,375 B1 | 4/2003 | Sargent et al. | 114/45 |
| 6,626,093 B1 | 9/2003 | Van Der Touw et al. | 100/100 |
| 6,739,732 B2 | 5/2004 | Tseng | 362/183 |
| 6,863,827 B2 * | 3/2005 | Saraceno | 210/748 |
| 7,124,680 B2 * | 10/2006 | Poss et al. | 100/229 A |

FOREIGN PATENT DOCUMENTS

JP    2002015610 A    1/2002

* cited by examiner

*Primary Examiner*—Jimmy T Nguyen
(74) *Attorney, Agent, or Firm*—Thomas M. Saunders; Seyfarth Shaw LLP

(57) ABSTRACT

A trash compactor designed for public use is powered by a photovoltaic cell array. This allows the trash compactor to be placed in locations where no power is available, but with frequent human traffic. The compaction feature allows the unit to be emptied less often than a typical trash container. The trash compactor can include a storage system to store power for compaction cycles. A removable bin allows easy removal of the compacted trash. The removable bin can include multiple chambers for different trash types.

51 Claims, 14 Drawing Sheets

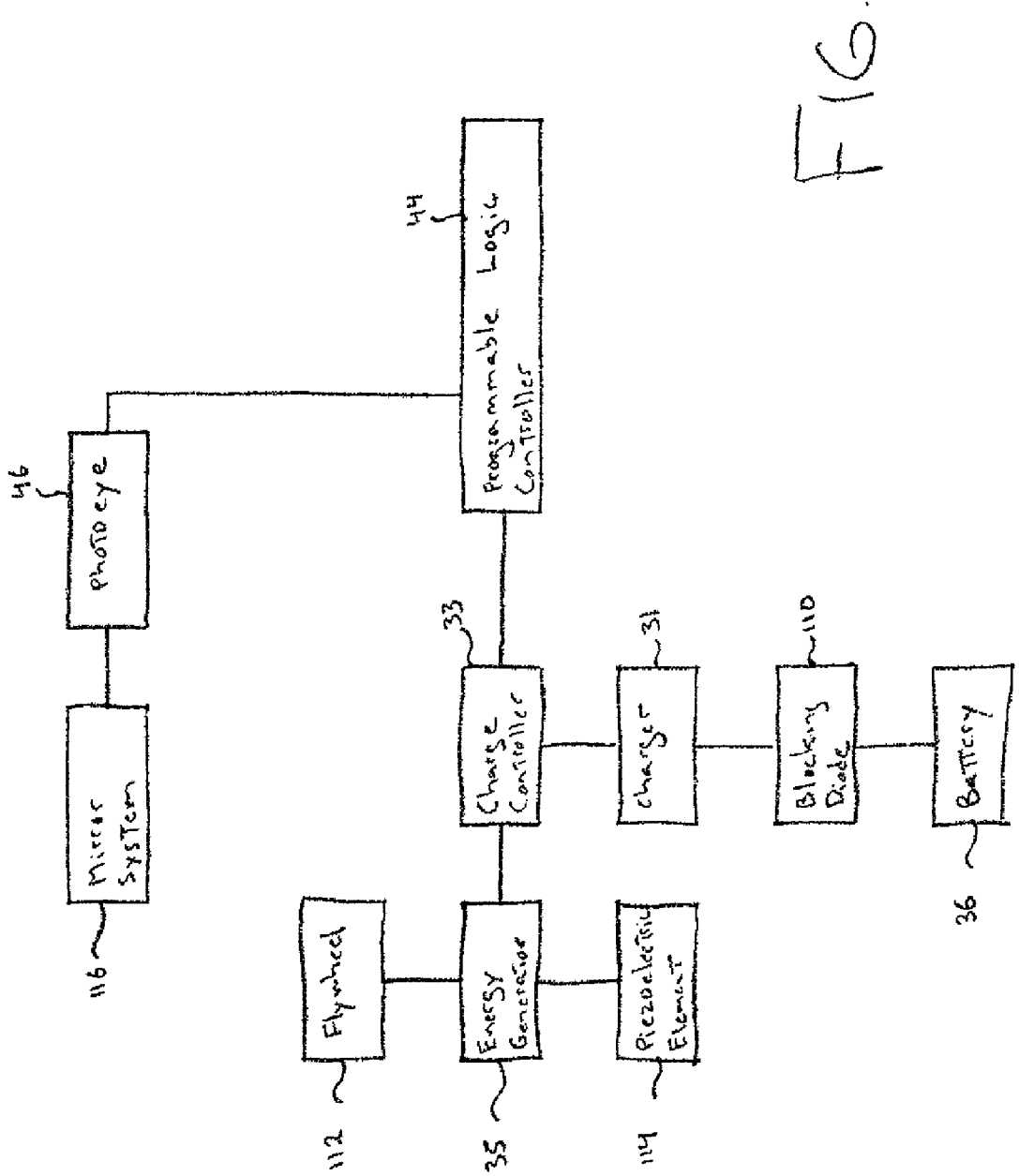

SOLAR POWERED COMPACTION APPARATUS

RELATED APPLICATION

This application is a continuation-in-part of U.S. Utility application Ser. No. 10/864,566, filed on Jun. 9, 2004, (now U.S. Pat. No. 7,124,680), which claims the benefit of Provisional Application No. 60/476,832, filed on Jun. 9, 2003.

FIELD OF THE INVENTION

This invention is directed towards compactors for crushing trash or recyclables, and more particularly to an apparatus and method for solar-powered waste compaction.

BACKGROUND

Garbage cans and trash receptacles are important items at any location where there are people, to avoid the people having to carry trash with them or worse, simply littering. Many public areas such as outdoor recreation facilities provide trash cans at many locations, and most visitors are quite receptive to using such trash cans, provided that they are convenient and accessible. However, trash cans often quickly fill up and require periodic emptying by maintenance personnel. Larger trash cans provide more capacity, but they still fill up and result in larger bulky unwieldy loads when they're emptied. For any size, trash cans that are remote are more difficult to empty, and require that personnel spend time and equipment traveling, emptying and hauling from the remote locations. Also, in urban locations and other high traffic areas, sanitation personnel must spend significant amounts of time and cost to remove trash and recyclables often several times daily, and urban areas often have space constraints on trash-bin size.

As is well known, typical trash is fairly bulky and is capable of being compacted down to smaller sizes. Most trash collection trucks utilize hydraulic compactors to increase their capacity.

Compaction on-site can save money and help to conserve fuel by reducing collection frequency, and thus vehicle travel time. Prior art trash and recyclables compactors characteristically require high-voltage, AC electricity, and are almost ubiquitously connected to the electricity grid. This limits the location of such trash compactors. Others have a fuel tank associated with them, such as with compaction mechanisms onboard garbage trucks or certain compactors that use diesel generators to provide power for compaction rams. These gas or diesel systems produce great noise and pollution as they operate. Thus, prior art trash compactors are characteristically confined to areas where electrical connections are feasible and cost-effective, or where there is a fossil fuel power source.

There is a need for powered compaction in remote settings and high-traffic areas, that will allow people to conveniently dispose of trash or recyclables, but allow much less frequent emptying service from maintenance personnel.

SUMMARY

The present invention uses the novel approach of using solar energy to compact trash and recyclables. Solar energy is a clean source of power, and also it enables compaction of waste in remote locations where other forms of power are impractical and uneconomical. Often, it is impractical and uneconomical to connect grid power to a compactor located even at a relatively close distance to an electricity source, for example, across a parking lot from a retail establishment.

This invention provides a low cost device and method for compacting trash and recyclables using stored photovoltaic energy. The device is formed to efficiently collect solar energy, efficiently store said energy and as needed, use the stored energy to compact trash or recyclables. The solar collector typically is a photovoltaic (PV) apparatus which is connected to a storage device, Such as a battery, capacitor or fuel cell. Mechanical means of energy storage may include springs, pneumatic and hydraulic pressure. The apparatus uses stored energy to intermittently compact trash or recyclables. In another embodiment, the device supplies AC electricity to an AC-powered compaction mechanism by changing DC power from the PV array into AC electricity by means of an inverter. In a separate embodiment, the device supplies pressurized hydraulic fluid to a compaction ram that is actuated by hydraulic pressure.

In an illustrative embodiment, the electronics of the receptacle are enclosed in two compartments adjacent to the compaction area. This compartment is not accessible from the outside, to prevent tampering and/or user injury. Another feature to prevent user or operator injury is a battery disengage, which will prevent compaction-ram movement when either compartment door is open and will provide access to electronics or the compaction chamber. This works because the lock is coupled with a contactor switch, so whenever a door is open, the contactor switch is open as well. The battery and electronics compartments are also sealed from water to protect the enclosed electronics from the elements, and the battery compartment is vented separately from the electronics and motor compartments to allow for hydrogen gas to escape safely, as the flammable gas can be produced during charging of many types of batteries. The PV array is protected from weather and vandalism by a covering constructed typically of durable plastic and a metal grate. The battery is stored at the bottom of the compartment, in order to lower the center of gravity of the receptacle, and prevent tipping, while the hydrogen vent is located above the battery chamber to allow hydrogen gas to rise and escape the chamber without coming into contact with sparks from the motor or electronics compartments. At the bottom of this compartment is the motor, which is connected to the reduction gearbox and drive chains.

The waste insertion door is locked shut during a compaction cycle or is constructed to block from user intrusion into compaction chamber. This safety measure eliminates the possibility of a user being injured by the compaction ram. In the illustrative embodiment, this use lockout is passive and does not require energy to operate. Similar contraptions are seen on mailboxes, and prevent the user from access to the inner chamber of the device. Other safety measures include a locking mechanism on the access door to the waste bin to prohibit the general public from removing the waste. Only waste management personnel can access the waste chamber and electronics chamber. An access door is hingedly attached to allow the sanitation personnel to have unimpeded access to the waste bin.

Another embodiment can incorporate several compaction rams and/or compaction chambers, allowing for separation and compaction of different recyclable materials. It may also include mechanisms such as paper or plastic shredders, and bottle or can crushers, to more effectively reduce the volume of many materials. Since such an embodiment can be constructed to have multiple compaction chambers, the overall weight of each collection bin can be reduced, which will reduce worker injury associated with heavy loads.

Another embodiment of the present invention allows monitoring of the trash level in the compaction chamber. By monitoring the level of trash or recyclables in the chamber, a wireless communication mechanism can relay this information to the sanitation personnel so that unneeded visits are avoided. Communication may be relayed with a wireless transmitter or by a physical indicator, such as an indicator lamp. This further saves time and money by allowing the maintenance personnel to schedule collections according to demand.

Another embodiment of the present invention is constructed to be easily moved by virtue of a towing apparatus that enables many devices and/or compaction bins to be connected to each other, so that a single vehicle can tow many devices at once. This works much like luggage carts at the airport. This unique method of trash removal also helps to reduce worker injuries associated with carrying heavy loads.

Advantages of the present invention include a trash or recyclable collector which can be located in remote places that don't have access to AC power, and also require many fewer maintenance visits for emptying, while reducing litter.

Another advantage of the present invention is that it is optimized to work more often during times of most usage. Peoples' use of the device will occur most often during daylight hours, and therefore the unit has power from daylight as needed to perform compaction. Further, since more people are active outdoors during sunny days, the present invention is optimized to meet increased usage with increased compaction cycles.

Another advantage of the present invention is that the collection bins which handle dense, heavy waste, are positioned on a wheeled cart, reducing heavy lifting by sanitation personnel. Since waste is packed into two or more compartments, each load is made lighter, further reducing the strain for workers of lifting loads.

Another advantage of the present invention is that the system is animal-proof, for everything from insects to bears. Access to the contents is blocked by doors and circuitous paths. Odor which is objectionable and which also can attract critters is reduced by the design.

Another advantage of the present invention is that it allows bin capacity information to be relayed wirelessly, helping to avoid wasted trips and time. Real-time information provides an advantage over traditional reactionary scheduling methods. Real-time information will enable significant improvements in routing and scheduling techniques, and can be reduced to software to automate and optimize waste collection scheduling and routing decisions.

BRIEF DESCRIPTION OF THE DRAWINGS

The foregoing and other features and advantages of the present invention will be more fully-understood from the following detailed description of illustrative embodiments, taken in conjunction with the accompanying drawings in which:

FIG. 14 is a block diagram of a control system for an illustrative embodiment including a mirror system to detect the level of trash.

DETAILED DESCRIPTION

The present invention is directed towards a waste collection receptacle with integrated solar compaction mechanism for public use. The generally rectangular metal unit has a solar panel on the top to attract maximum sunlight. The unit typically resembles waste receptacles currently in use, with respect to aesthetics, usage and size.

Figure 1:
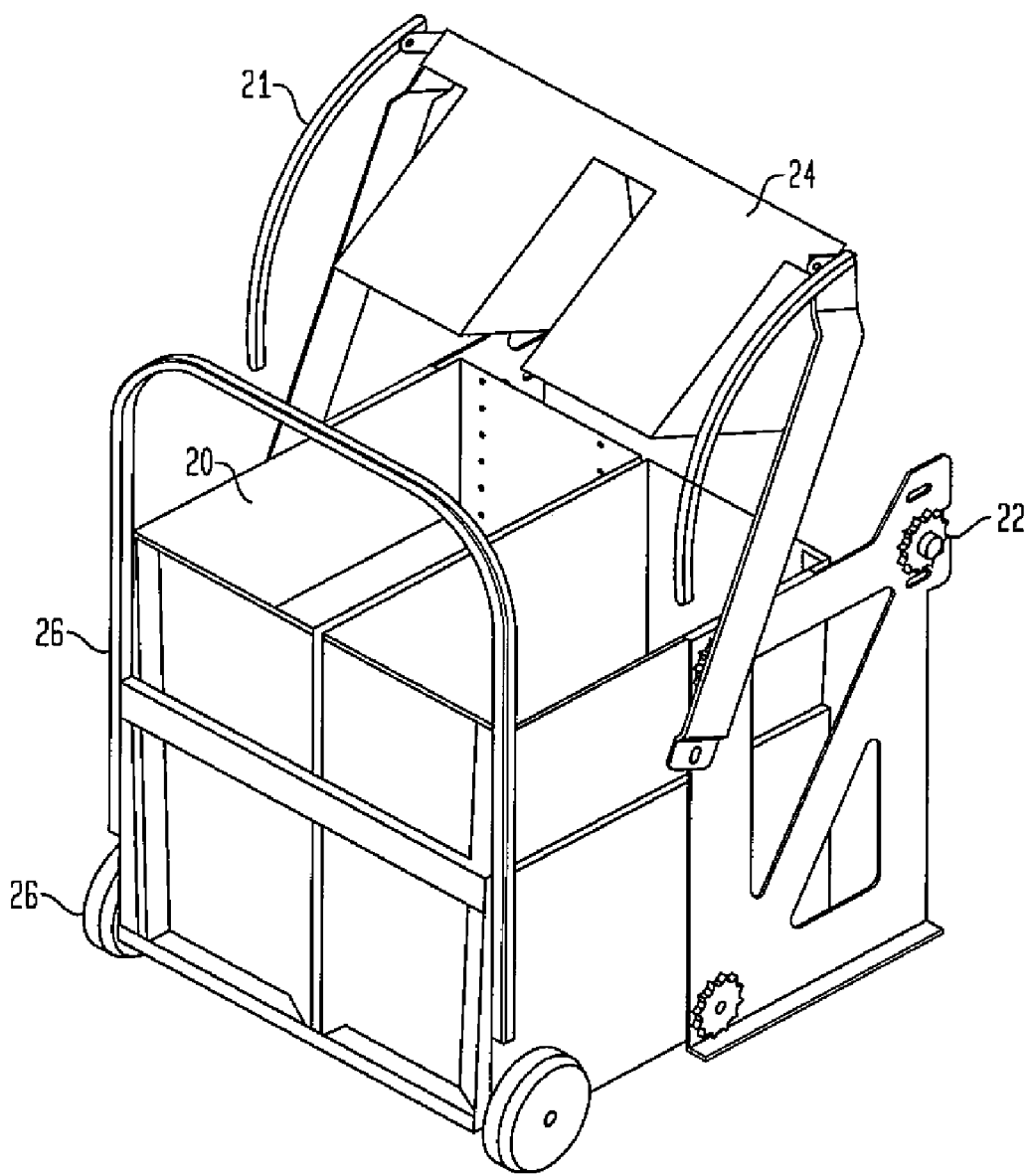
FIG. 1 illustrates a compaction ram and compaction chambers according to the present invention.
Figure 2:
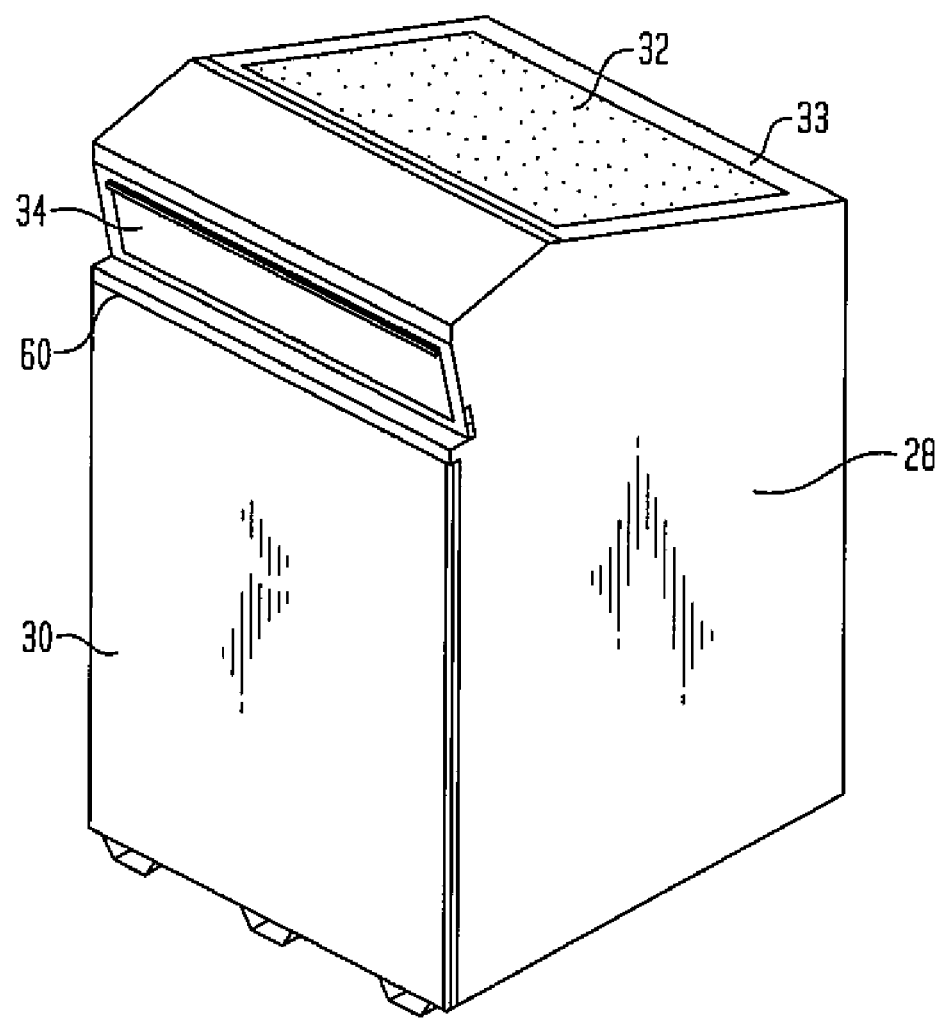
FIG. 2 shows an illustrative embodiment of the present invention.
Figure 9:
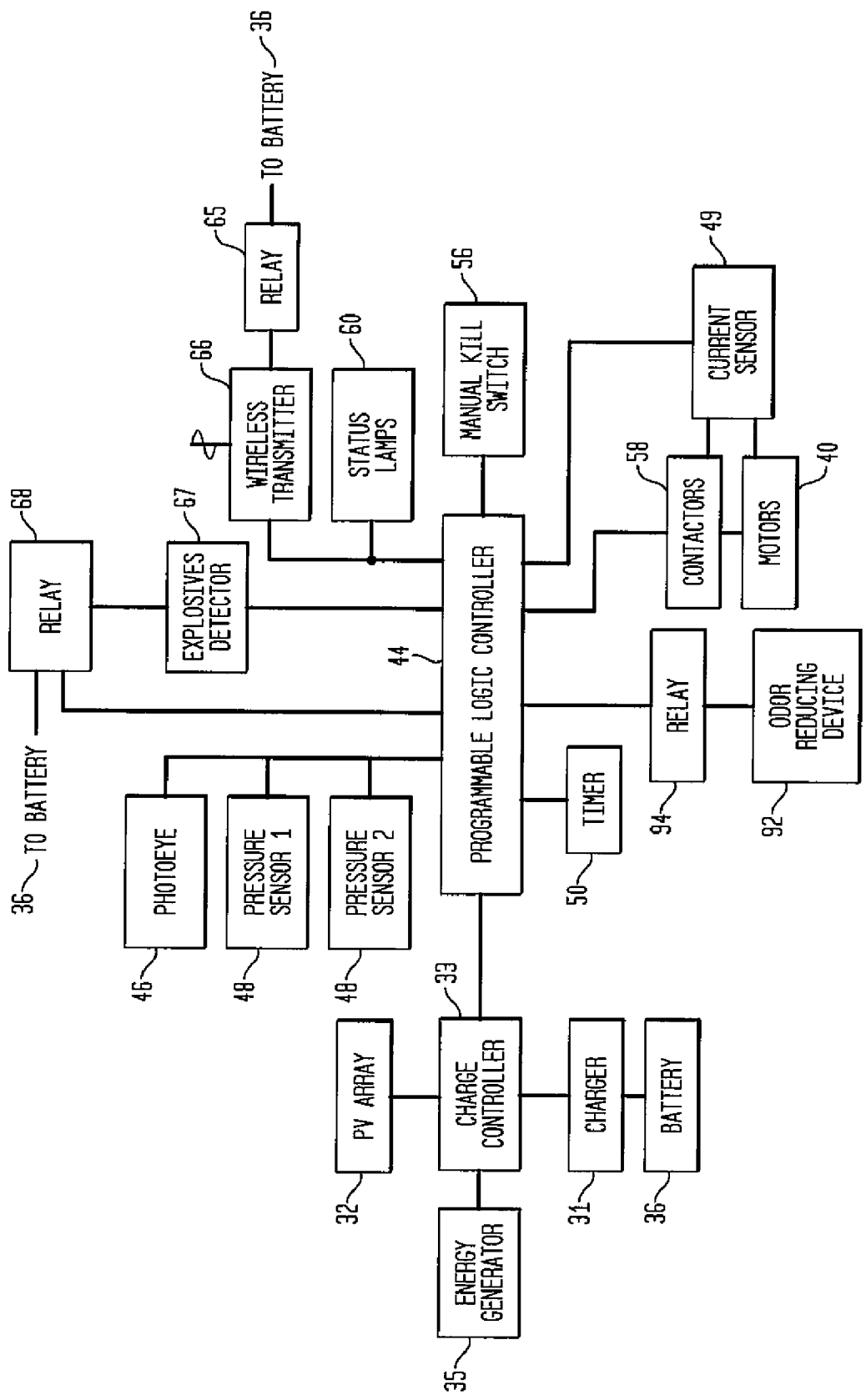
FIG. 9 is a block diagram of a control system for an illustrative embodiment.

FIG. 1 provides a perspective view detailing the compacting ram 24, chain drive sprockets 22, ram guide track 21, and compaction chambers 20, showing the relationship between the compaction mechanism and the compaction chambers, according to the present invention. The compaction chambers 20 can include a handle and wheels 26 for easy removal. A solar-compaction system according to the present invention is shown in FIG. 2, illustrating the orientation of the components of the outer container 28, as well as showing a position of a hinged waste removal door 30, and a trash insertion door 34. A photovoltaic (PV) cell array 32 is mounted on top of the unit, covering much of it. In one embodiment, cells 32 produce enough power for the average number of 15 compaction cycles per day, and the battery 36, shown in FIG. 4, has enough energy storage to provide for usage through weeks of intermittent sunlight. The cells are wired to the energy storage system, which stores power to drive the compaction. Status indicator lamps 60, FIGS. 2 and 9, provide visual means of displaying information such as a system malfunction or to indicate the level of bin capacity used and available. A trash insertion door 34 acts to prevent user injury because it locks out the user from the trash compaction area. Insertion door 34 is optimally coated with a removable, slippery material such as Teflon®, so that sticky items, such as ice cream or chewing gum, do not stick to the insertion area.

Figure 3:
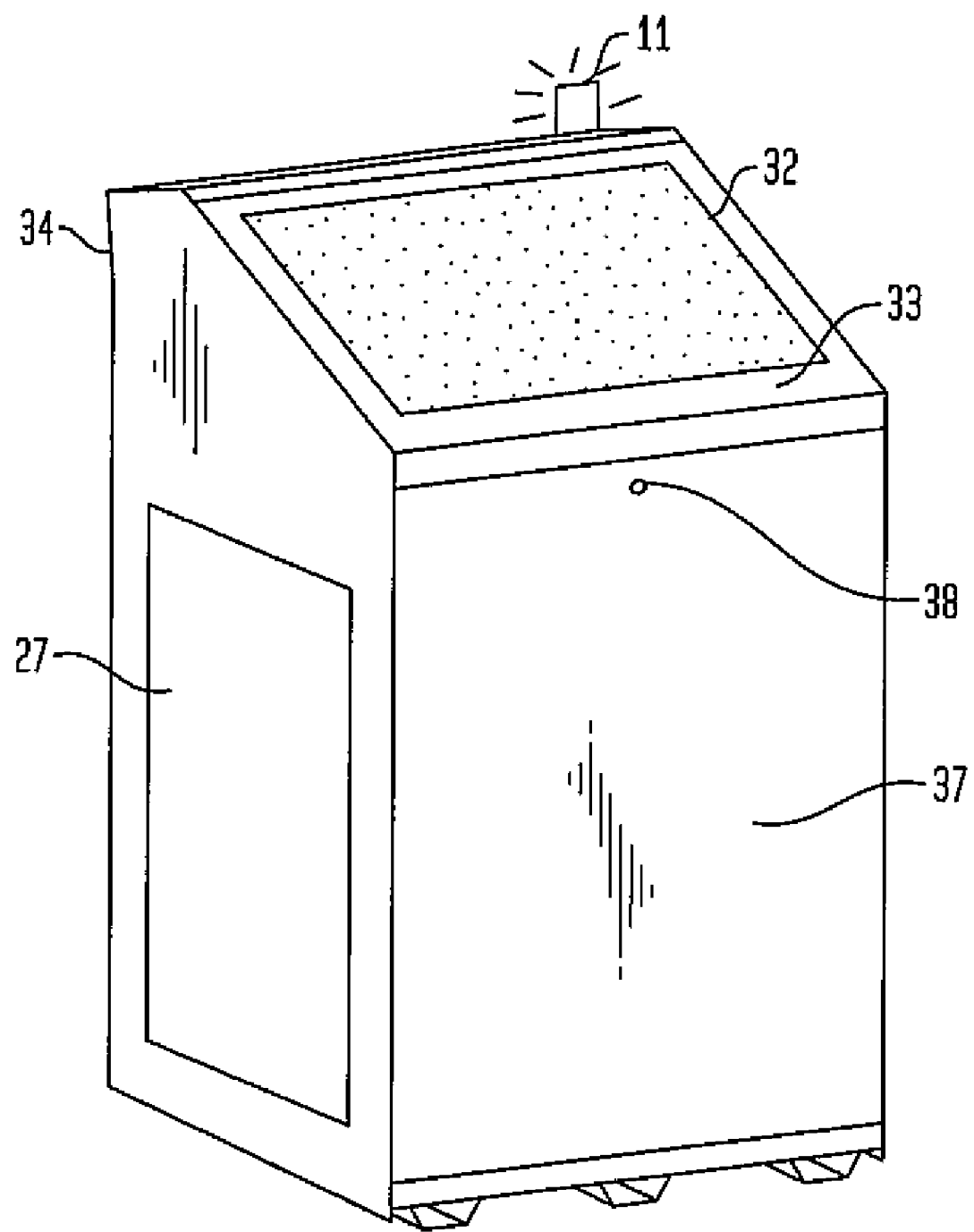
FIG. 3 is a perspective view of a second illustrative embodiment according to the present invention.
Figure 4:
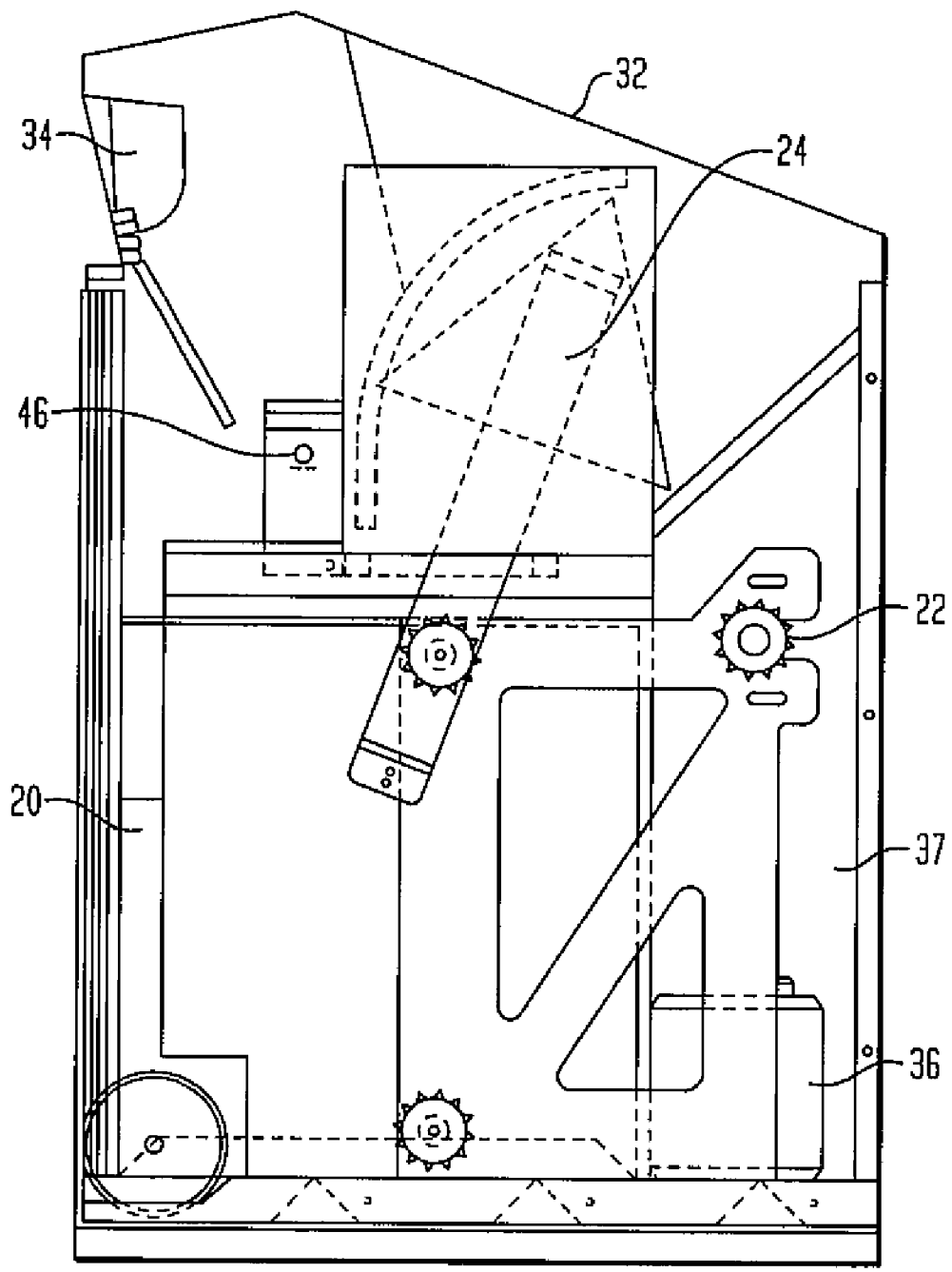
FIG. 4 is a side sectional view of the illustrative embodiment of FIG. 3.

More details are provided with the illustrative embodiment shown in FIGS. 3 and 4. The Photovoltaic (PV) array 32 is positioned on top of the device for maximum sunlight exposure. The PV array 32 may also be placed on other sides of the device to increase exposure to the sun when the Sun is lower on the horizon. The PV array 32 may be optimally placed on an angle to prevent it from being covered by snow or debris. Further, the angle may be used to increase sunlight exposure based on azimuth of the sun across the sky. For example a PV may can be arranged to receive the most southern exposure during the day. Alternatively, the PV array 32 may be pivotally mounted and powered in order to rotate and track maximum sunlight exposure. Although the PV array 32 is shown attached to the unit, the PV array may also be separately located from the device and electrically connected. The PV array may alternatively be located inside the outer cover 28, and the outer cover may be constructed to allow sunlight into the protected area where the PV resides. The PV array may otherwise be mounted in a location on or outside the outer container accessible by light via a reflective surface such as a mirror, and inaccessible by vandals, negligent operators and animals. Optimally, there is about a 1:1 ratio between the top view of PV array 32 and the device. The angle of the PV array 32 can be flat but could be positioned at any angle or could be able to be adjusted so that the installer of the machine can set the solar panel angle for optimal solar collection.

As shown in Figures 2 and 3, the PV array 32 is optimally placed between layers of foam 33, to absorb shock in the event that the machine is bumped or tipped. Additionally, there can be a curved plastic, such as a Lexan® panel or layers of Lexan® and air over PV array 32 to protect PV array 32 from vandals or negligent use. Additionally, the plastic panel layers will shed water and snow.

The PV array 32 can be covered by a thin layer of protective coating that can be cost-effectively replaced. In one embodiment, several layers of plastic coating, or other suitable material, may be applied during manufacturing such that one layer can be removed at a time, providing several layers of protection against vandalism, graffiti and scratches. For example, when one layer is used up, it is peeled away and a new, clean layer is present. This same method may be more effectively implemented as a way of keeping the inside of the trash door clean.

The compaction ram 24 is shown in the resting position above the compaction chambers 20, FIG. 4. The illustrated embodiment includes a two sided ram to improve compaction capability and to facilitate removal by decreasing weight of each load, FIG. 5. The chain drive sprocket 22, upon rotating, drives chain 42 forward, driving the attached compaction ram 24 down, compacting the load. Alternatively, the compaction ram 24 may move up or sideways, depending on the design of the system. The removable bin 20 includes a handle and wheels to roll smoothly in and out of the outer container 28. In one embodiment, the trash could be deflected toward the rear of the trash compartment, under compaction ram 24 to allow for more complete compaction. This would allow a longer time period between compactions, reducing the amount of energy used by the device.

The storage battery 36 is located preferably at a low point in the container to provide stability. The storage battery or batteries 36 can be upsized or downsized for different climates, compaction demands, or for or auxiliary functions, such as providing usable AC electricity through an inverter. The battery or batteries may also be stored separately from the container. The electronics compartments are preferably located in a weather-proof area 37 of the container. Electronic components can include a motor controller, battery charging controller, user interface, and sensors, as will be described below. The access door 38 to the electronics area 37 is key-lockable. When unlocked, the battery 36 will preferably be automatically disengaged.

Figure 5:
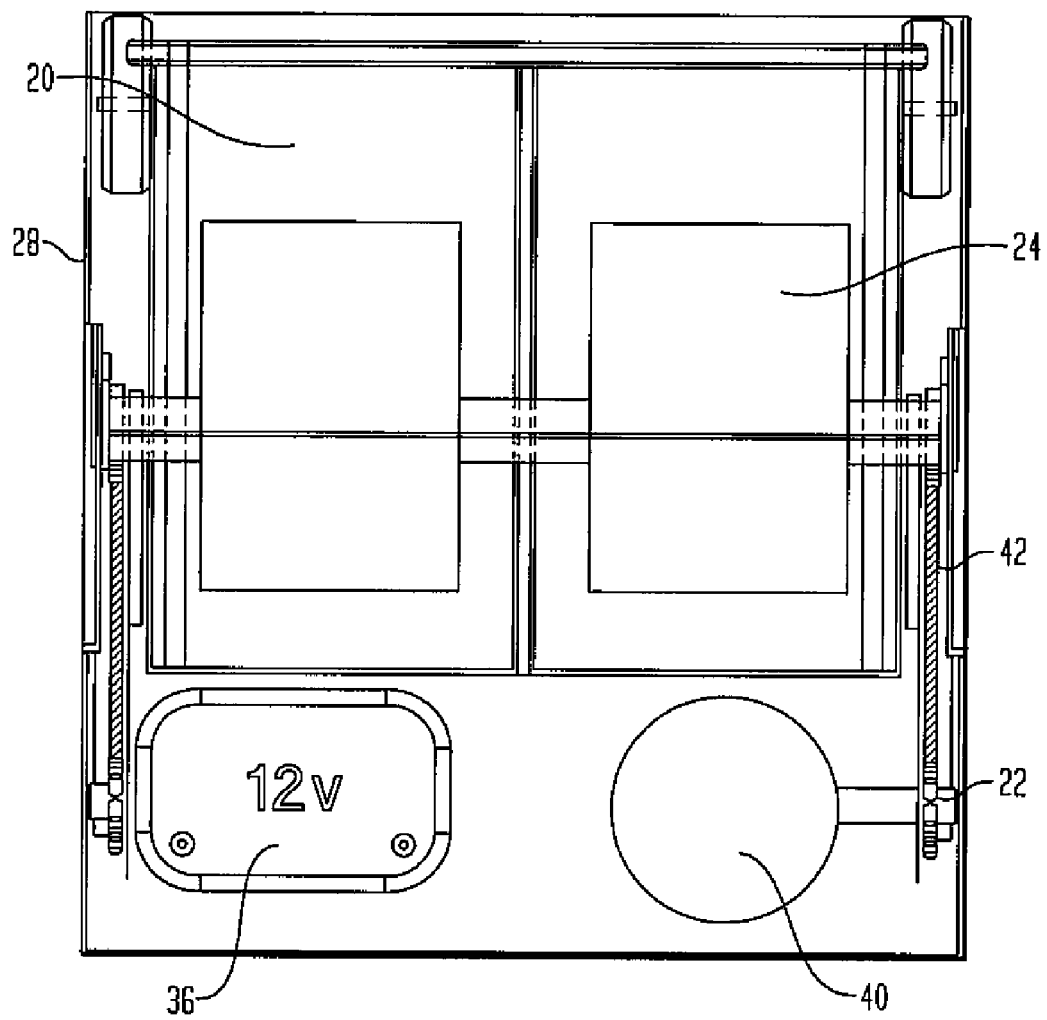
FIG. 5 is a top sectional view of the illustrative embodiment of FIG. 3.

In the illustrative embodiment, a deep cycle battery 36 is employed to drive a DC motor 40, FIG. 5. The motor 40 drives a chain 42, which rotates sprockets rigidly connected to the unit 22, and which transmits the crushing force to the compaction ram 24. Alternatively, the motor 40 may provide power to the chain drive 22 through a drive shaft and gears, including reduction gears, or one or more motors 40 may be directly attached to the chain drive 22, or the motor or motors may be connected via reduction gears to chains or lead screws, which control the position of the compaction ram.

Alternatively, a hydraulic piston may be used to move the compaction ram. In this embodiment, the motor is used to drive a fluid pump, which supplies pressure to the hydraulic cylinders to move the ram. Optimally, the chain drive system can be made to use as few sprockets and gears as possible to reduce friction in the system. One embodiment of the present invention uses two sprockets on each side with a vertical chain drive 22 to reduce frictional losses. The vertical chain drive 22 reduces operational resistance, increasing efficiency.

Figure 6:
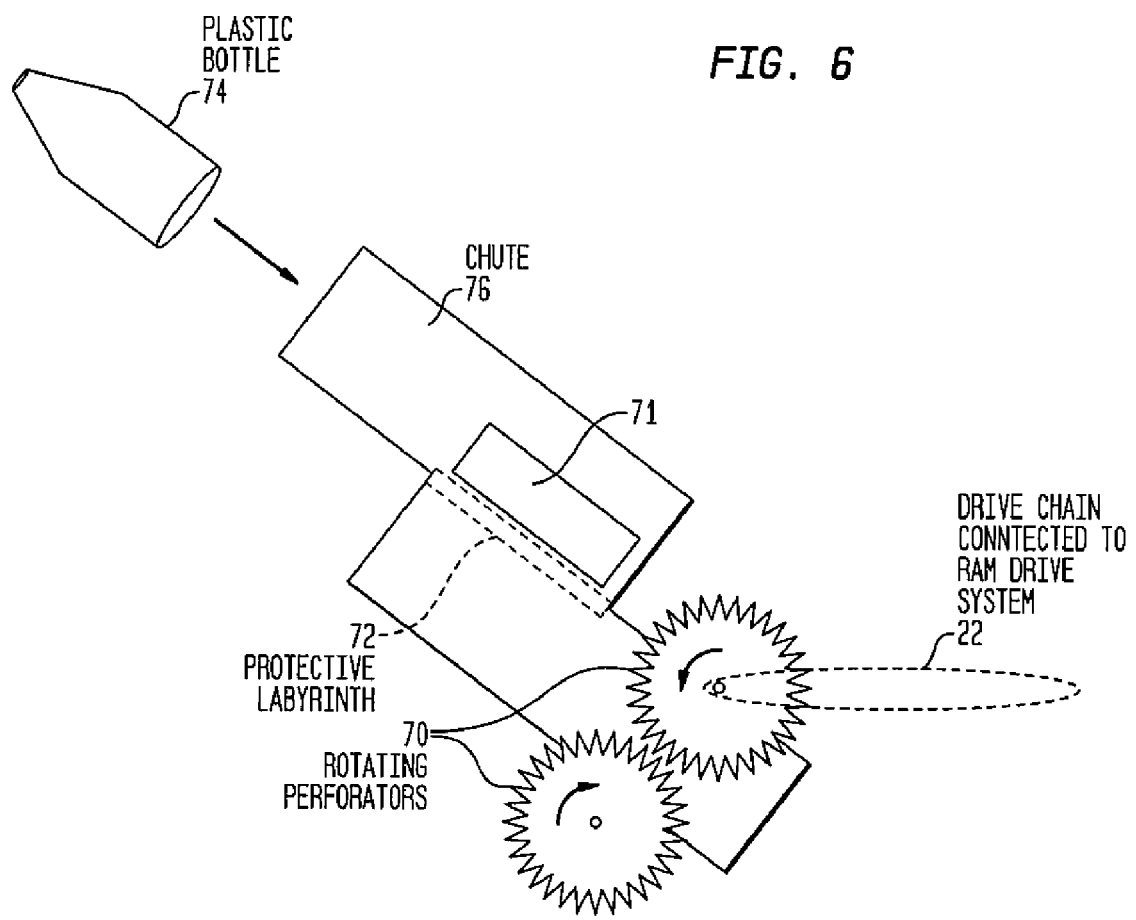
FIG. 6 is an isolated view of a perforator in accordance with an embodiment of the present invention.

Another embodiment, directed toward recycling, is shown in FIG. 6. In a recycling embodiment, a chain drive 22 is connected to rotating perforators 70 as to perforate plastic containers so that air can be easily pushed out of the containers by the compaction ram. There is a protective labyrinth 72 to prevent users from inserting their hands into perforating area. A plastic bottle 74 is shown entering a chute 76. Bottle 74 then enters protective labyrinth 72 and into the perforation area having the rotating perforators 70. The rotating perforators 70 turn with each compaction cycle, in one direction only, because they are connected to the chain drive 22 with a ratchet gear. With each compaction cycle, the perforators 70 rotate, bringing bottle 74 through chute 76 while perforating them. This enables the compactor to eliminate air space in the bottle, making it more compactable. This embodiment may include be several insertion openings for different materials. Materials are optionally pushed into a closed-top bin so that the materials do not expand after the compaction cycle has ended. Also in this embodiment, there is optionally a "diversion mechanism" to prevent trash materials from contaminating the recyclable material. This diversion mechanism may be operated by scales or sensors which are able to detect materials visually (i.e., visual sensors 71, FIG. 6) or by material density, such that the materials are inserted into the proper compaction chamber. A controlling component, as explained in further detail below, can be programmed to engage the sensors and determine material properties.

Figure 7:
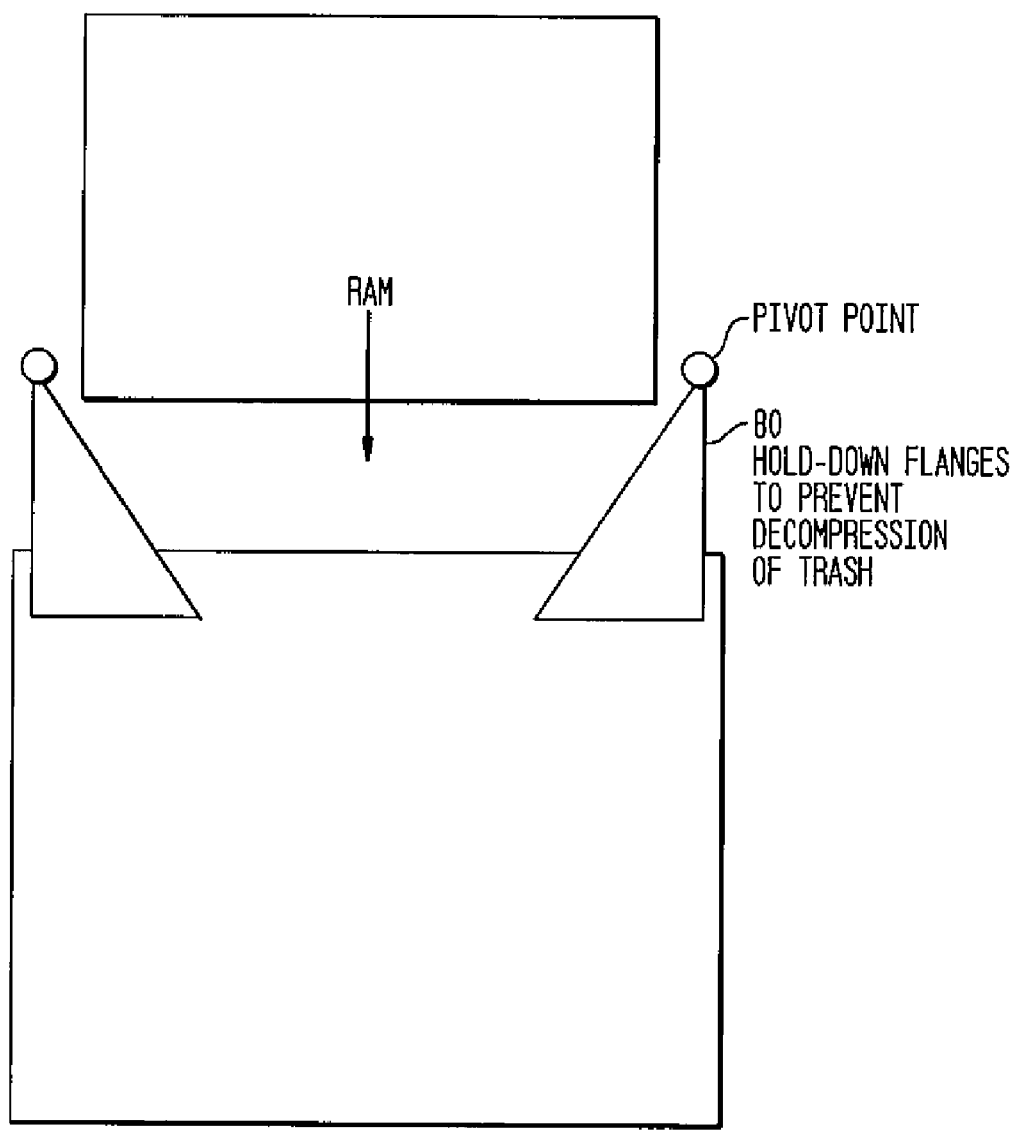
FIG. 7 shows an embodiment of the present invention including pivoting flanges.

Another embodiment directed to holding trash in place is shown in FIG. 7. The illustrative embodiment includes a compactor according to the embodiments above and further including hold-down flanges 80. These hold-down flanges 80 keep trash in place with the goal of reducing the number of compactions needed to compact trash and keep it compacted. The hold-down flanges 80 may be pivotally attached to the body of the device such that upon lowering of the compactor ram 24, the flanges 80 pivot allowing the ram 24 to lower and compress the garbage. Upon retraction of the ram 24, the hold-down flanges 80 pivot back such that the bottom surface of the flanges 80 prevent the compressed garbage from expanding, or decompressing, and rising above the top of the bin.

Figure 8:
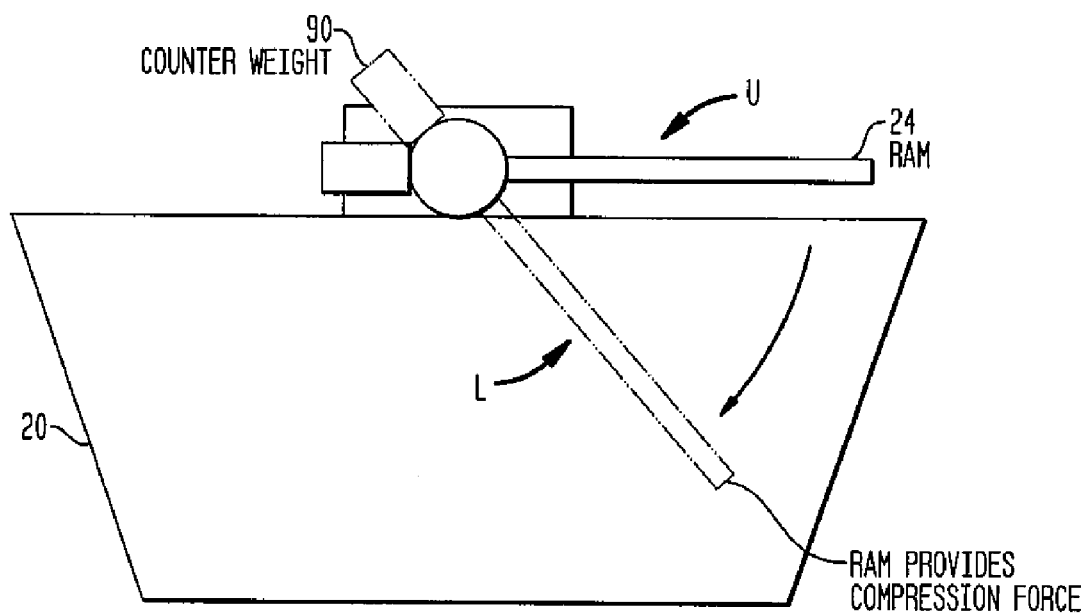
FIG. 8 shows an embodiment of the present invention including a vertical ram with a counterweight.

Another embodiment is shown in FIG. 8 and is directed to conserving energy. A vertical ram compactor includes a counter-weight 90 so that movement of compacting ram 24 takes less energy. Typically, ram 24 may be heavy-gauge steel, and weighs over 400 lbs. Traditional compactors use significant mounts of energy to return the ram to the up position. This is wasted energy, since the weight of the ram is not used effectively to compress materials. Counter-weight 90 reduces force needed on upstroke to save energy. After the ram 24 is lowered through the bin 20, shown at Position L, and the garbage compressed, the counter-weight 90 on the top of the ram provides a downward force thereby reducing the energy required to raise the ram back to its retracted position, shown at position U. A control apparatus for the illustrative embodiment is shown in FIG. 9. The motor controller 44 is a central microprocessor which manages all operations, detects all inputs and provides outputs for running the device. It controls power to the motor 40 by relays or contactors 58, FIG. 9 (mechanical or solid-state) or other switching means. A photo-eye 46 is located above the compaction chamber 20, FIG. 4, and is actuated when trash blocks the light rays between this photo-eye sensor and a reflector on the opposite side of the channel above the compaction chamber. The photo-eye signals the programmable logic controller (PLC) 44 when trash blocks the light beam for a measured amount of time, indicating that trash is located in the channel above the compaction chamber, and should be compacted. Other sensors may be used to detect the level of trash, including, for example pressure sensors, micro switches, scales, etc. In an alternative embodiment shown in FIG. 14, a mirror system 116 may be implemented instead of a photo-eye transmitter and receiver to reduce wiring and wire installation labor costs.

Pressure sensors 48, FIG. 9, are located above and below the compaction ram 24 and are actuated when the compaction ram has reached the end of its downward and then upward cycle. The sensors provide input to the controller PLC 44. The controller 44 can also receive input from the motor 40 that signals that the compaction ram 24 has reached the bottom of its downward cycle by means of a centrifugal switch on the motor 40 or a current sensor 49 in the controller 44 which detects motor current, or other type of sensor. When the motor 40 has reached the bottom of its cycle (or jams), it will stop due to the upward force on the ram from the compacted trash, or due to irregular forces that cause the ram to jam. At this point, the motor will stall, and a centrifugal switch sends a signal to the motor controller 44 to stop or reverse the direction of the motor 40, or the current sensor 49 (programmed current limit) linked to the motor controller 44 senses high current in the stalled motor, and will reverse the cycle, returning the compaction ram 24 to the top of its cycle. Otherwise, the motor 40 may be stopped by use of a manual kill switch 56, or activated by a manual actuator 57. In this illustrative embodiment, the current sensor is linked to a timer 50 through the PLC 44, which will allow the motor controller to gauge the travel distance of the compaction ram before motor stall, and thus measure the degree of "fullness" in the trash bins. In the illustrative embodiment, the maximum load is reached when the 12V motor reaches 40 Amps. If this current limit is reached within 10 seconds, then the controller will gauge that the compaction chamber is ½ full. If the current limit is reached within 5 seconds, then the controller will gauge that the compaction bin is full. Another method of indicating "fullness" is sensing ram travel with a rotational encoder located on the drive shaft. The PLC 44 senses conditions and then indicates status through a wireless data transmitter 66, and through status indicator lamps 60.

In this embodiment, the projected PV array output is 50 Watts Peak, and will generate, on average, 150 Watt-hours of energy per day, given an average of 3 hours of full sunlight available per day. Sunlight energy is collected in the PV Array 32, FIG. 9, and is converted by the charge controller 33, into a useful battery charging current and voltage. Battery reserve will be approximately 600 Watt-hours, and each cycle will use approximately 3 Watt-hours. Thus, the energy reserve in the illustrative embodiment is enough to run Lip to 200 compaction cycles. The controller will be programmed to permit compaction cycles such that battery over-discharge and thus battery damage is avoided. Since many electrical components are popular in 24 volt configurations and most PV arrays are available in 12 volt charging configurations, it may be economically advantageous to provide for 12 volt battery charging and 24 volt systems operations. This may be accomplished through the use of a relay and contactor switch, which will change the system voltage from 12 volts to 24 volts each time a compaction cycle is initiated.

In another embodiment which does not use an embedded microprocessor, the switching and control is performed using solid-state electronics, as shown in FIG. 8. The cycle is triggered by a "Start" signal, shown as a key switch 54, however other devices may be used, including a pushbutton, photoelectric sensor, weight sensor etc. When the cycle begins, the motor will turn on and latch into the "forward" (down) mode. A lamp will turn on, indicating that a cycle is taking place. If the bin is not full, the compaction ram will actuate the lower pressure sensor 48, which will then turn the status lamp 60 off. If the bin is full (pressure sensor or limit switch is not actuated), the lamp will remain on after machine cycle is done, alerting sanitation staff that collection is needed.

The motor will run in forward until either lower limit switch or pressure switch is reached, or until a timeout occurs. A timeout will occur if the amount of trash prevents the ram from reaching the bottom in the time allotted for a normal downward cycle. When the ram stalls, a clutch 47 will disengage the motor, allowing the motor to spin at no-load. Motor will spin at no-load until timeout occurs and motor is reversed. When motor reverses, clutch will automatically re-engage.

Upon hitting the lower limit switch or reaching a timeout, motor will stop for a preset time delay, then will reverse. The motor will run in reverse until the upper limit switch is actuated. When the upper limit switch 48 is reached, the motor stops and a new timer begins. A start signal will be ignored until this timer is finished. Once the cycle delay timer is done, the system is reset and ready for a new start signal.

The system includes a separate safety interlock switch 49 on the access door for emptying the bin. This switch disengages the power supply from all the control elements when the access door to the compaction area is open (this switch also resets the "bin full" lamp).

Figure 12:
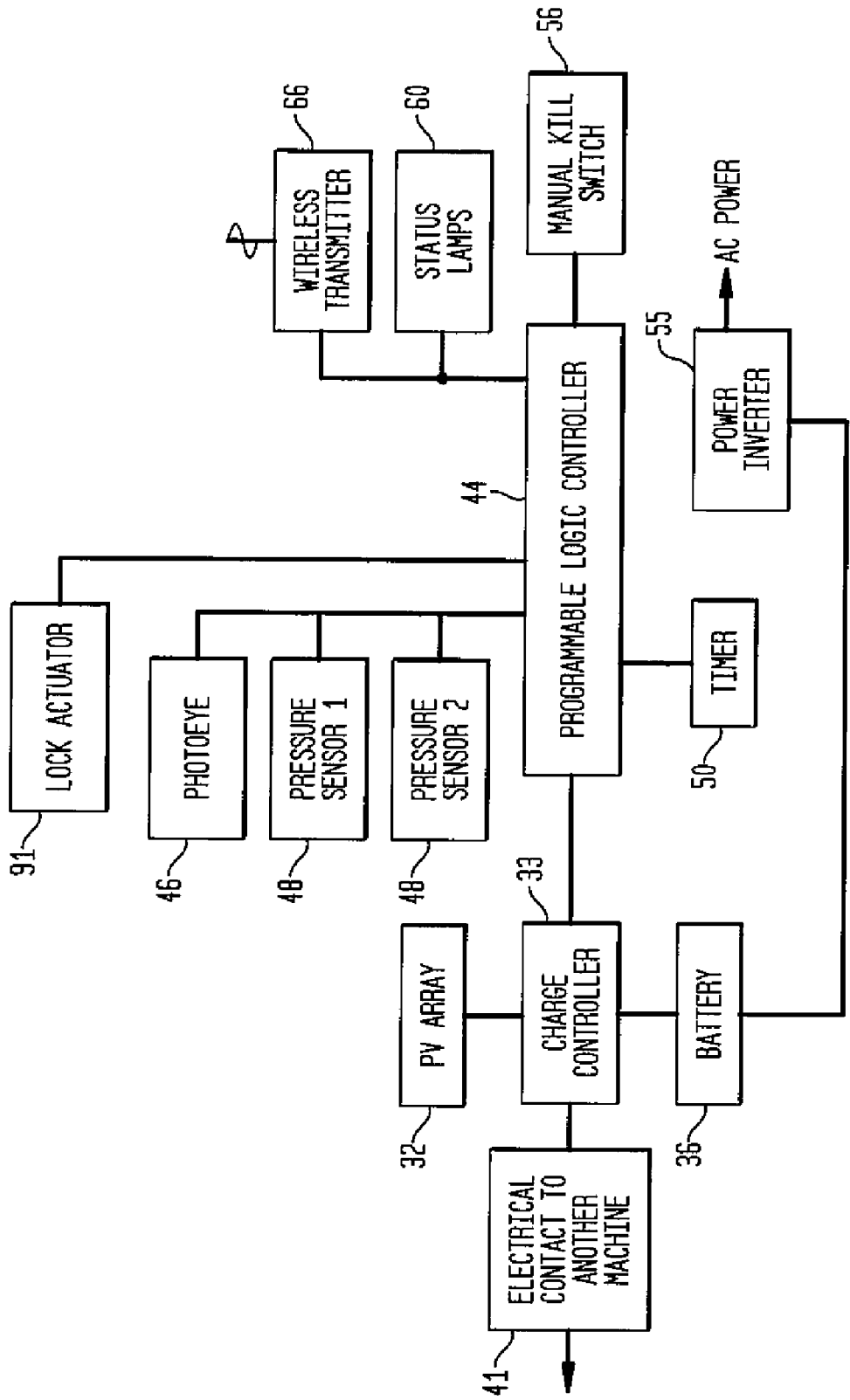
FIG. 12 is a schematic of an alternative control system providing AC power.

In another embodiment shown in FIG. 12, the motor controller 44 outputs AC power to an AC motor, allowing the same invention to power AC compaction mechanisms. The motor controller 44 includes a power inverter 55 (including either a pure sine wave or modified sine wave) to provide alternating current power for an AC motor. This is advantageous because many of the existing compactors in the field use AC power. Thus, the present invention, as shown in this embodiment, can power a traditional compactor with solar power and embedded control logic. Further, the present invention can include an electrical power outlet accessible from outside of the enclosure.

Figure 10:
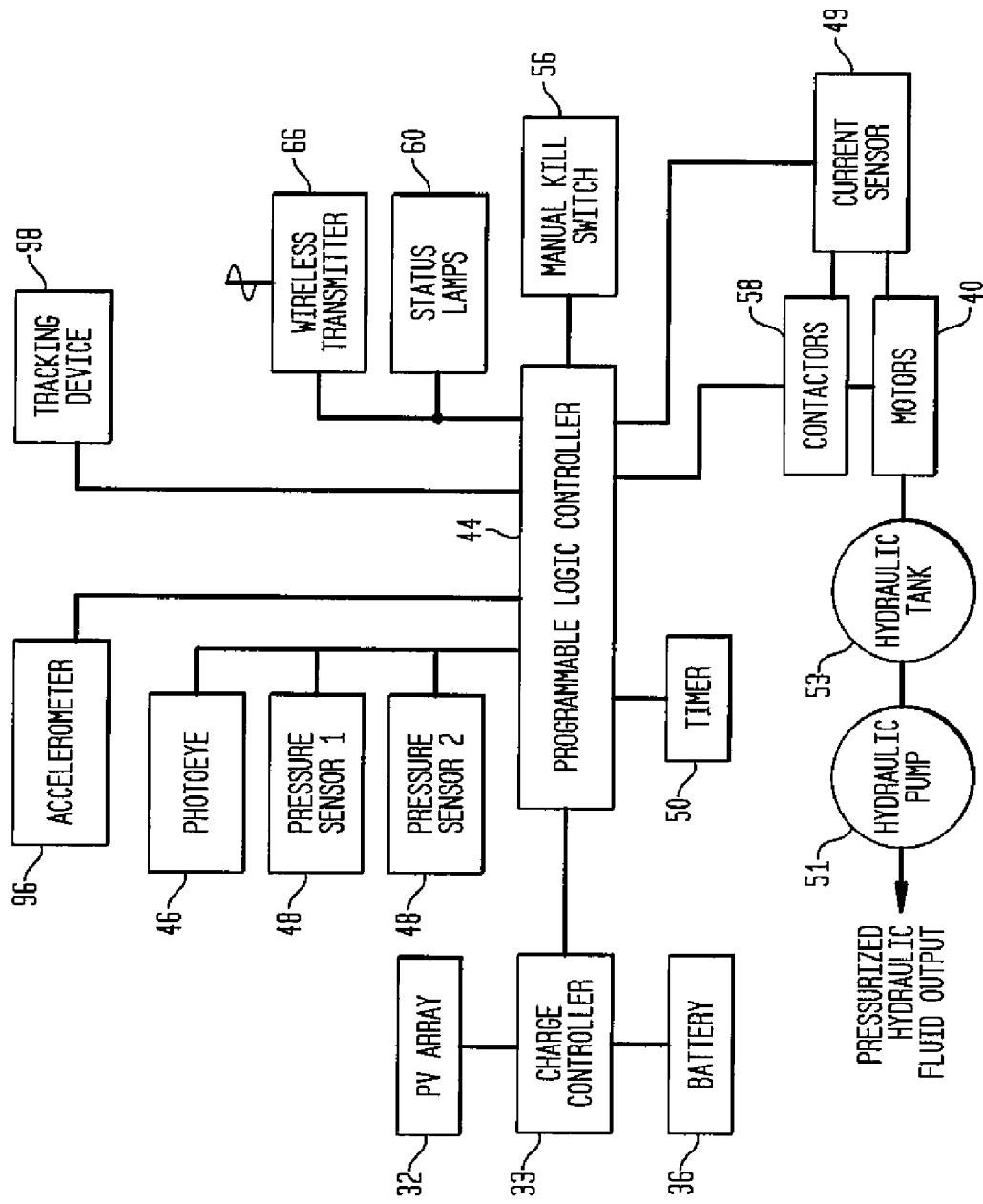
FIG. 10 is a block diagram of an alternative control system supplying hydraulic fluid.
Figure 11:
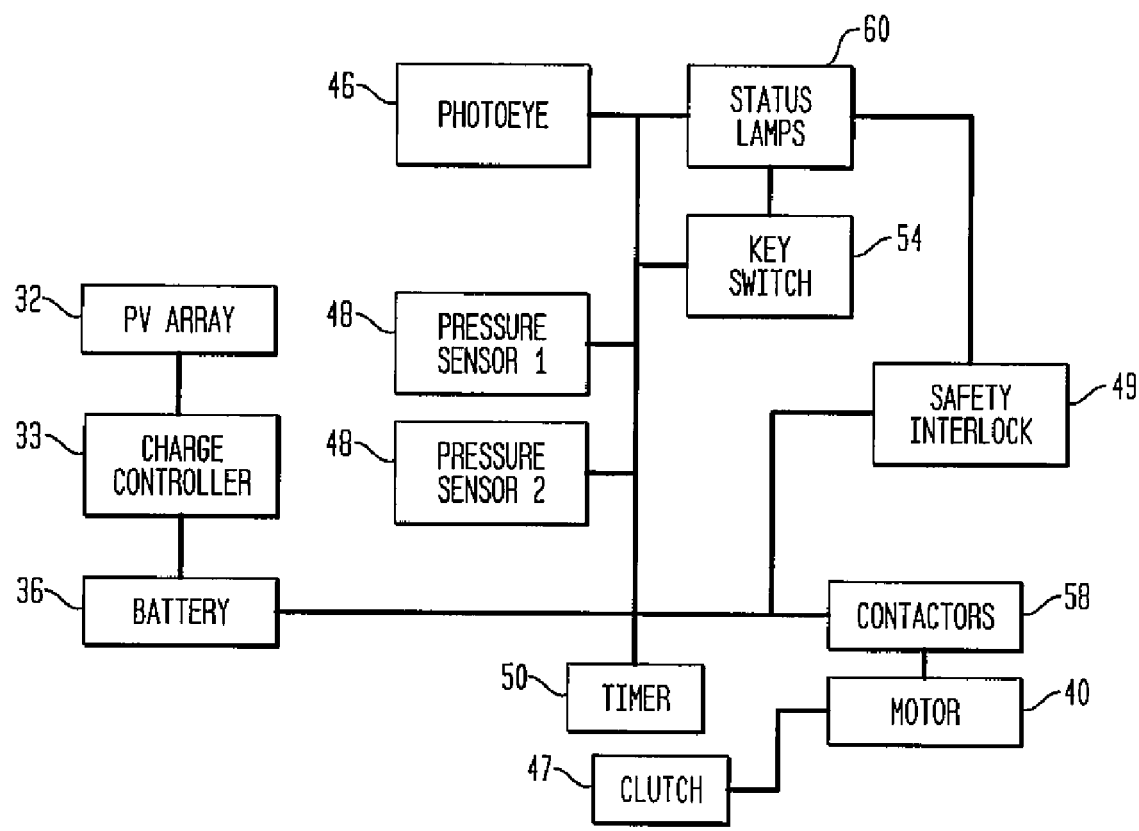
FIG. 11 is a schematic of electronics according to one embodiment.

Yet another embodiment of a controlling system is shown in FIG. 10. In this embodiment, the device uses a hydraulic pump 51 to pressurize hydraulic fluid from a tank 53, allowing the same invention to power a compaction mechanism that utilizes hydraulic fluid pressure cylinders to move the compaction ram. This is advantageous because many of the existing compactors are hydraulic, and require a hydraulic pump that is powered by AC electric power or internal combustion engine. The present invention, as shown in this embodiment, can power a traditional compactor with solar power and embedded control logic and a DC motor. This can save money and setup time, and allow compaction with various types of mechanisms to be used in remote locations not currently economically serviced by common electricity lines or with current compaction methods. Alternative systems may be used, and are within the scope of the present invention. For example, a pneumatic pump can be used to inflate a bladder inside the compaction chamber 20, thereby compacting the trash without requiring a compacting ram and chain drive system.

A feature of the illustrative embodiment is that the motor controller 44, when in charging mode, can act as a maximum power tracker, regulating the charging of the battery from the PV array. The power tracker has the ability to vary the level of voltage and amperage based on the characteristics of the PV array, the sunlight level and the battery condition. The power tracker has the ability to balance off current and voltage to optimize battery 36 charging. The motor controller 44 has the ability to optimize the charging regimen of the batteries 36, by tracking the level of photovoltaic energy available and the battery charge. When the battery 36 is fully discharged, the controller 44 will provide low voltage and high amperage. When the battery 36 is almost completely charged, the controller 44 will provide a higher voltage and lower current. When the battery is fully charged, the controller will not provide any charge to the battery 36, or will simply provide a trickle charge. Conversely, when the battery 36 is undercharged, the controller 44 may delay or skip a compaction cycle until adequate charge has been attained. This serves to save battery life and prevent failure. Because of the ability for the controller 44 to optimize charging regimen and control the motor, it serves a dual purpose.

Typically, the duty cycle of the compaction apparatus is higher during peak traffic hours. For example, during lunch time, there will be more waste discarded into the device. This duty cycle can be controlled by a timer, or by a photo-eye as described above. One illustrative method is to use a photo-eye because it will optimize compaction cycle to meet the demand for compaction. This allows for maximum charge time between needed compactions, and minimizes noise and downtime due to the compaction cycle. This duty cycle is typically determined by low power timing, circuitry contained in the receptacle. It is modifiable on the unit, or is programmable by means of a wireless communication device or by electrical connection between the programming device (i.e. computer) and the PLC 44. The controller 44 can also include data logging features, to allow compaction cycle history to be stored for later analysis. In one embodiment, a battery disconnect may be attached to one or both of the battery supply cables. When either the trash bin removal door or the electronics door is opened, the battery is automatically disconnected, to prevent injury.

Table 1 provides specifications for a system in accordance with one embodiment of the present invention.

TABLE 1

| Physical Specs of Unit | | |
|---|---|---|
| Size of Ram | | |
| Width | 8.00 | Inches |
| Length | 12.50 | Inches |
| Number of Rams | 2 | |
| Weight | 20.00 | Pounds |
| Size of Compartment | | |
| Height of bin | 24.00 | inches |
| Length of bin | 19.50 | inches |
| Width of bin | 10.50 | inches |
| plunge of ram | 8.00 | inches |
| height of ram | 10.00 | inches |
| Volume of Bin | 42.54 | gallons |
| Volume available after compaction | 15.79 | gallons |
| Worst case volume after compaction | 7.89 | gallons |

TABLE 1-continued

| Physical Specs of Unit | | |
|---|---|---|
| Compaction ratio | 4:1 | |
| Volume of raw trash collected | 107.17 | gallons |
| Best Case number of compactions | 8.08 | per fill |
| Worst case number of compactions | 16.17 | per fill |
| Desired Pressure Chain Drive | | |
| Diameter of Drive Sprocket | 3.00 | inches |
| Length of Ram/Chain Travel | 18.00 | inches |
| Compaction Time | 30.00 | seconds |
| Desired Pressure | 10.00 | PSI |
| Compacting Force | 2000.00 | pounds |
| Motor Specs | | |
| Horsepower | 0.50 | HP |
| RPM | 1800.00 | RPM |
| Voltage | 12.00 | volts |
| Max Amps | 39.00 | amps |
| Power Numbers | | |
| RPM at Chain drive | 8.00 | RPM |
| Torque | 3983 | HP |
| Cycle Time | 30 | Seconds |
| Power Consumption Losses | | |
| Drive Mechanism | 80.00 | percent |
| Chain Drive | 80.00 | percent |
| Energy Consumption per compact | | |
| Energy of compaction stroke | 1.41 | W*hrs |
| Energy of retraction stroke | 0.94 | W*hrs |
| Energy Needed per cycle | 2.35 | W*hrs |
| Energy Needed per cycle w/losses | 3.36 | W*hrs |
| Compactions Needed | | |
| Compactions per day in High Volume Use | 12.13 | |
| Energy Used per day | 40.77 | W*hr |
| Battery | | |
| Voltage | 12.00 | Volts |
| Amp*hours | 55.00 | Ah |
| Watt*hours | 660.00 | W*hr |
| Average Temperature (Min) | 14.00 | Deg F. |
| Efficiency Due to Temp (round trip) | 60.00 | Percent |
| Actual Energy per battery | 396.00 | W*hr |
| Days of Compacting w/o charge | 9.71 | Days |
| Days to completely recharge | 10.30 | Days |
| Photovoltaic | | |
| Number of Cells | 35.00 | Cells |
| Area of PV | 560.00 | Square Inches (4" x 4" cell) |
| PV Specs | | |
| Energy from Sun | 0.66 | W/in^2 |
| PV efficiency | 15.00 | Percent efficient (14-22%) |
| Peak wattage of PV | 55.44 | Peak watts |
| Power from Cell | 0.10 | W/in^2 |
| Capacity factor (avg sun) | 70.00 | percent |
| Hours at avg capacity | 3.00 | hours |
| Energy Collected per day | 116.42 | W*hr |
| Adjusted available energy | 52.39 | W*hr |

The embodiment as shown in FIG. 10 may also include a controlling component able to control multiple motors so energy is saved by using a weak but efficient motor for some of the ram stroke and a slower, more powerful motor only wherein needed, at the end of the ram stroke. Alternatively, a controlling component could be implemented that is able to switch valves for higher flow or higher pressure in hydraulic lines thru a cycle.

Also, a controlling component able to switch gears in transmission, for more efficient ram stroke could be implemented. Other possibilities to increase the efficiency of ram stroke include, but are not limited to: incorporating automatic transmission for more efficient stroke; incorporating a controlling component able to regulate voltage and current for most efficient stroke; or having a controlling component able to switch from hydraulic accumulator energy storage to battery to make a more efficient "hybrid" system that has the dual benefits of reducing energy and speeding cycle time, which is a good performance trait.

Most of the hydraulic pumps operate at 1400 psi. The embodiment shown in FIG. 10 is a mechanical system designed to offer similar pressures on the ram face. Below, illustrative ram face pressures are given in Table 2. They are generally 25-20 psi, and the pressure differences represent different ram face sizes. Table 2 represents illustrative systems capable of completing 20 cycles per day. Table 2 takes into account the complexities of sunlight, inclement weather, effects of temperature on hydraulic viscosity and battery performance, and different performance needs. Based on climate, placement and performance, these values may be adjusted higher or lower to accommodate the conditions.

TABLE 2

| Size Bin | Motor size | Ram Pressure | Energy/Cycle | PV Size | Battery Size |
|---|---|---|---|---|---|
| 4 Cu. Yards | 2 HP | 15,000 lbs | 15 Watt hours | 80 W | 3.7 kWh |
| 8 Cu. Yards | 3 HP | 20,000 lbs | 20 Watt Hours | 180 W | 5.5 kWh |
| 20 Cu. Yards | 5 HP | 30,000 lbs | 30 Watt Hours | 280 W | 9.1 kWh |

Table 3 represents systems capable of doing 50 cycles per day:

TABLE 3

| Size Bin | Motor size | Ram Pressure | Energy/Cycle | PV Size | Battery Size |
|---|---|---|---|---|---|
| 4 Cu. Yards | 2 HP | 15,000 lbs | 15 Watt hours | 200 W | 6.4 kWh |
| 8 Cu. Yards | 3 HP | 20,000 lbs | 20 Watt Hours | 298 W | 9.5 kWh |
| 20 Cu. Yards | 5 HP | 30,000 lbs | 30 Watt Hours | 496 W | 15.1 kWh |

Certain embodiments may include additional controlling components. For example, a controlling component programmed to reduce or increase the clock speed (processor speed) to save energy may be implemented into PLC 44. Logic of the controlling component slows the clock speed when no cycles are being run. During a compaction cycle, clock speed of timer 50 runs fast so that sensing of motor current, ram position and sensors is measured accurately. Failure to slow clock speed of timer 50 results in wasted energy, and failure to speed clock speed can result in system breakage because components can be stressed beyond their safe limits due to sensing not happening fast enough to react to forces that can increase quickly as a function of time. A microcontroller, such as a PIC processor, may be is used in PLC 44. During compaction and sensor activation, the processor operates at approximately 4 Mhz. Otherwise it operates at approximately 32 Khz.

In another embodiment, a controlling component programmed to flash LEDs for a fraction of a second every few seconds to save energy is implemented in PLC 44. The controlling component may be programmed to flash LED notification lamps faster as the bins become more full. The controlling component can flash the LED notification lamps the fastest when the bin is at its fullest capacity. This allows a user to sense urgency of emptying the compacter. For example, the LEDs illuminate for 100 ms every 1.5 seconds. As the bin fills with trash, the time between LED illumination decreased to increase the perceived sense of urgency to the LED flashes. Flashing faster would indicate the urgency of servicing the device.

Additionally, a controlling component programmed to turn on sensors such as pressure sensor 48 or current sensor 49 only as long as they need to be in order to properly respond to the sensor signal may be implemented in PLC 44. Certain photo-eye sensors, such as photo-eye sensor 46, must be turned on for a minimum period, for example 0.3 seconds, to reliably respond to the input signal. This saves energy because the sensors consume energy only when they are on. Logs may be stored in hard drive memory. These logs may be uploaded wirelessly to a central server so status information to users via cell phone or email or SMS (text message) can me relayed.

Another feature may include a controlling component and door sensor programmed to engage photo-eye sensor 46 only when trash is deposited, rather than at regular intervals, to save energy. The controlling component is therefore programmed to trigger photo-eye sensor 46 after insertion door 34 has been opened. In this embodiment, there is a transducer such as an inductive sensor or Hall effect sensor, located on insertion door 34 to allow for a signal to be sent to the controlling component indicating each usage.

In one embodiment, the controlling component is programmed to shut down unused circuits within PLC 44. Specifically, the controlling component is programmed to turn off the current sensor and relays when the bin is in monitoring mode and turned on when in compacting mode to save energy. Certain areas of the controlling component may be activated or deactivated according to different methods. In certain embodiments, the activation of discrete controlling components is implemented through either a MOSFET component, a relay or through different pins on the processor directly for areas of the circuit requiring lower current. By constantly monitoring and turning off circuits of the controller when those circuits are not required for operation, energy may be conserved.

As shown in FIG. 9, another embodiment includes a controlling component that is programmed to regulate the battery charger 31 to eliminate battery charger 31 energy consumption when solar power is not sufficient enough to charge the battery. The controlling component is programmed to actively monitor wattage from the solar panel and to turn off the controller when the wattage drops below a threshold voltage. The battery charger 31 is only turned on when adequate voltage on the panel is reached, and off when it is not. Since many battery chargers require some activation energy from the battery to begin the charging process, the controlling component is programmed to supply the activation energy only when solar energy is available. Alternatively, FIG. 14 shows that a blocking diode 110 may be used to keep current from flowing from the battery to the battery charger 31. Thus, no energy is able to pass from the battery 36 to the battery charger 31; it is only able to come from the PY array 32 when it has sufficient voltage to charge the battery.

The battery charger requires activation energy to charge the battery. Without this activation energy, it blocks any current from going through the charger to the battery. By placing a resistor between the positive lead of PV array 32 and positive lead of charger, the PV array 32 can provide that activation energy when there is sun on the PV array 32. Once operating, the charger is the lower resistance path, so energy flows through the charger to the battery.

Figure 13:
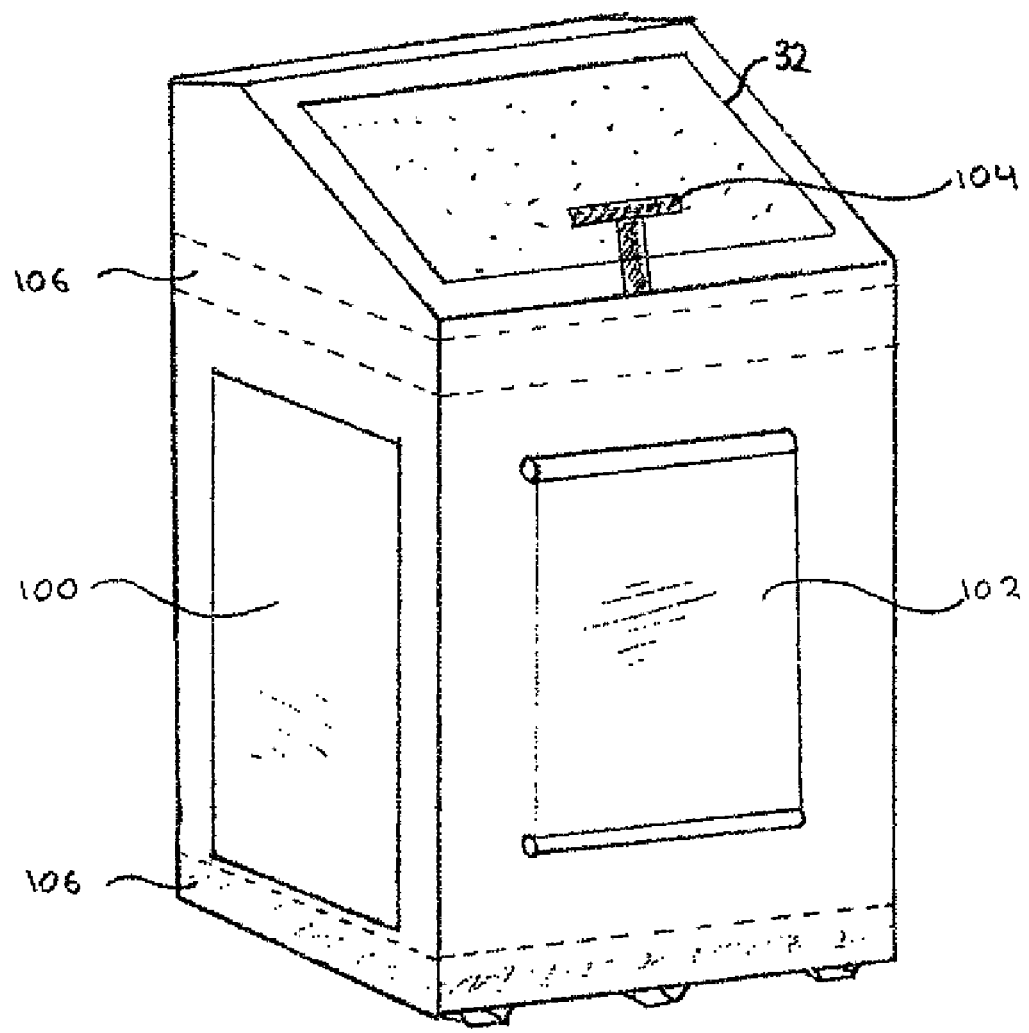
FIG. 13 shows an embodiment of the current invention including a lighted sign.

In one embodiment an infonnation panel 27 (see FIG. 3) may be incorporated. FIG. 13 shows that the information panel may be a lighted sign 100, a scrolling panel 102 or other method that may be used to display information or advertising. These information panels may be intermittent-use devices. The intermittent powering may help control the energy budget because the panel can charge between cycles, similarly to the compaction mechanism. In another embodiment, the intermittent-use feature may be used in controlling the lighting of the device. Cycling the lighting at very rapid duty cycles that are invisible to the human eye, energy can be conserved. In an alternative embodiment, the lighting may be pulse modulated at slower cycles, thereby conserving energy. In yet another embodiment, the signage may be controllable via wireless receiver from a base location. For example, the base station may want to post an electronic message such as an advertisement or emergency message on each waste receptacle.

Another illustrative embodiment includes a controlling component that is able to disengage energy draws when voltage is low. For example, in many settings, the machine may be able to power lighted signs as discussed above. The controlling component may programmed to disengage these signs from the electricity source (i.e. battery 35) when the voltage is low as a means of conserving energy for trash compaction or other prioritized function.

A controlling component that is able to disengage electricity to the motors of a scrolling advertisement signal wherein there is not sufficient voltage to power the signs' motors may be incorporated. The controlling component may do this by powering a relay to connect electricity to the sign's motors only when there is sufficient voltage to power the sign. Additionally, the controlling component can be programmed to power the sign's motors only when advertising is beneficial, at lunch hour in a busy outdoor area, for example.

Another embodiment includes a controlling component that is programmed to search for the best source of energy. In a machine that has the ability to be plugged in, for example, the controlling component would default to solar power source unless the machine is plugged in. When plugged in, the unit's energy-storing capability absorbs large fluctuations in energy use, which lowers the peak current that the machine draws. This is advantageous because utility-supplied electricity charges are based on both total draw and peak draw. This feature may reduce peaks. For a unit that is charged by a utility supplied electrical source, the controller can have a real tine clock installed to only charge the battery during "off peak" times, typically during the nighttime, when electricity rates are lower than in daytime. This may be accomplished with a controlling component that is programmed to engage and disengage relays to connect the best power source to the charging circuit. Alternatively, the relays may be wired to provide activation energy to the relay with the highest energy.

This present embodiment may be implemented in situations where units are rented and thus will be in use for a festival or other event and then placed on a charger when the event is over. In other situations where the unit is searching for the best source of energy, it may be programmed to use sunlight whenever there is sufficient charging current and to use utility electricity when sunlight is not adequate to charge the battery. Thus, it does not have to interpolate over time. An efficient charging interpolator would use sunlight during the day, and utility power at night, if both are available all the time.

A controlling component and electronics that enables recharging of the energy storage system by another machine may be implemented in an additional embodiment. The machines may link, as a chain, together to make electrical contact 41 (see FIG. 12) with one another. Alternatively, one machine may plug into a separate machine. In either embodiment, when machines are connected together electrically, one machine may provide a charging voltage to another. This is particularly useful when machines are in storage. If the user plugs one machine in to an electrical source, and other machines are connected (in a chain), then all machines could charge from a single outlet. Additionally, electrical contacts 41 to allow machines to be chained or connected in series such that one machine may charge another machine may also be implemented in another embodiment. This allows a group of machines to be recharged by a single electrical source.

In another embodiment, multiple compactors according to the embodiments described herein can be placed adjacent to one another. This could either be in a very busy location that requires more than one machine or in a location that wants three machine, one for trash, one for recyclables and one for paper. Inevitably, one of the machines will use more energy than the others. Linking the machines together, allows the machines using less energy to boost the charge on the machine that is using more energy.

Another embodiment may include a controlling component that is programmed to track voltage over a period of time, and if voltage is falling, the controlling component turns on an indicator telling users that the machine is placed in an unsatisfactory location or orientation and must be moved. This is advantageous because there are natural peaks and valleys in voltage that must be "averaged out" in order to determine if a location is bad. By monitoring voltage over 2 weeks, cloudy weather lows and sunny weather highs can be incorporated into a calculation that indicates placement optimization. Natural highs and lows can be averaged out over a 2 week period because inclement weather patterns rarely occur for more than 2 weeks. Also, 2 weeks of energy storage is sufficient but is not overkill. So a 2 week period is an optimal tine period.

In another embodiment, a controlling component could be programmed to monitor relative current values rather than absolute values to make the warning light more accurate at sensing trash density. For example, the controlling component does not sense that 5 amps have been achieved, it senses that 30% more amps than the motor used when operating under no load. This removes variances due to temperature and manufacturing variances, making the detection system more accurate. Additionally, during the initial stages of a compaction cycle, an operating current is measured. As the cycle continues and trash resistance is met, the current rises. Rather than indicating the machine is full when the current reaches 5 amps, the controller can determine that it is full when it has reached 3 amps above the operating current.

In yet another embodiment, the controlling component can be programmed to allow for a variety of pressure settings to be controlled by the user. In this embodiment, the controlling component receives a signal from a potentiometer which can be used to adjust the desired motor current thresholds, which correspond to desired ram pressure. By controlling the current at which the full signal is sent to the user, the bag weight can be managed by adjusting the dial. More force generally correlates to a higher bag weight because more trash can be deposited into the bin. For example, if the unit is placed in a location with much paper, there is a highly compactable load, and higher density would not cause the load to be too heavy. The user would increase the compaction strength so that collections could be made less often. In a place with lots of food waste, which is heavy and not as compactable, the user would reduce the pressure, allowing the user to collect before the bag becomes too heavy.

In an alternative embodiment, the compactor includes a scale, so that instead of adjusting ram pressure, the user may adjust bag weight. This could be accomplished with a spring loaded base plate upon which the bin and bag rest, and proximity sensors to indicate where the bin or bag rests. Alternatively, there could be a pressure transducer underneath the bin or in line with a suspending cable that holds the bin.

In another embodiment, a controlling component is programmed to control a variable speed transmission, or several low power and high power motors to achieve efficient ram movement and compaction. The majority of the cycle does not encounter resistance from the trash. It is either moving down to the trash height or retracting the ram after the cycle. There is the potential to see energy efficiency benefits from operating those sections of the cycle using a higher speed, lower force motor or transmission gearing. Thus, the low gear is only used when the ram is doing work, encountering a compacting load.

An additional embodiment includes means to generate energy (i.e., an energy generator 35 as shown in FIG. 9) from the insertion door movement. In one embodiment shown in FIG. 14, each time the door is opened, there is a piezoelectric element 114 that generates current when the door is opened. Alternatively, the insertion door movement may actuate a rotating flywheel 112, which then turns an energy generator 35, thereby producing current.

Another embodiment incorporates a controlling component that is programmed to engage a relay 65 (see FIG. 9) to turn on a wireless transmitter 66 when it needs to transmit a "full" or "malfunction" signal. The controlling component is programmed to disconnect the transmitter or receiver from the electrical system to save energy, and the electrical system is attached to the transmitter via relays 65 so this disconnect is physically possible.

Another embodiment includes bomb-sensing logic in a controlling component. The controlling component is programmed to engage a relay 68 (see FIG. 9) to turn on an explosives detector 67 when the machine is used. The controlling component is programmed to disconnect the detector 67 from the electrical system to save energy, and the electrical system is attached to the detector 67 via relays 68 so this disconnect is physically possible. The device may be outfitted with a camera that is activated by the opening of the insertion door. The device may store a photo of everyone who deposits trash into the machine in memory such as a flash memory device. Once the bomb sensing logic determines that no bomb is in the machine, the memory is dumped. Otherwise the photos may be wirelessly transmitted to assist authorities in catching the person who deposited the bomb. The photo would be stored in flash memory or the hard drive, or alternatively, could be transmitted wirelessly to a central server without first storing locally.

Another embodiment includes odor reducing devices such as sprays or ultraviolet lights as needed by controlling components. The controlling component is programmed to engage a relay 94 (see FIG. 9) to turn on an odor reducing device 92 when needed. The controlling component is programmed to disconnect the device from the electrical system to save energy, and the electrical system is attached to the detector via relays so this disconnect is physically possible. Other devices such as security monitoring cameras or emergency calling transmitters may be similarly controlled by the controlling component and detached from the electricity supply to save energy when they are not in use.

In yet another embodiment, an accelerometer 96 (see FIG. 10) may be implemented. The accelerometer 96 watches for high forces in the machine, indicating the possibility of theft or vandalism. Upon detection of an unauthorized event, a signal may be sent to the machine's owners so that they can respond in a timely manner to repair the machine and ensure that it is not in a state that would be dangerous to people. In an alternative embodiment, a tracking system, such as a global positioning system ("GPS") or other suitable tracking device 98 (see FIG. 10), may be implemented.

In yet another embodiment, an accelerometer may be implemented. The accelerometer watches for high forces in the machine, indicating the possibility of theft or vandalism. Upon detection of an unauthorized event, a signal may be sent to the machine's owners so that they can respond in a timely manner to repair the machine and ensure that it is not in a state that would be dangerous to people. In an alternative embodiment, a tracking system, such as a global positioning system ("GPS") or other suitable tracking device, may be implemented.

Another embodiment includes a controlling component that has the ability to override the manual actuator button if there is low voltage or a safety reason. For example, if there is a short circuit, the controlling component can override the manual run button actuator function Additionally, in another embodiment a controlling component is programmed to engage a solenoid or other actuator 91 (see FIG. 12) which locks the insertion door when the compaction chamber is full. This prevents overflow from the bin.

In an embodiment of the present invention, a variable speed transmission is used to reduce energy consumption by supplying high speed and low power when there is no force on the ram, but to apply high power and low speed when high compaction force is needed. The controlling component is programmed to control the transmission for optimal efficiency. Alternatively, the ram may be connected to the drive train with a ratchet so that gravity allows the ram to fall freely until is reached the trash. The drive train is then engaged to allow for compaction force to be put on trash. This removes the friction associated with a transmission and allows the "free travel" part of the ram's motion to happen without the use of battery energy.

In another embodiment, the device is sized to compact into a standard trash receptacle. As shown in FIG. 13, bracing 106 to prevent the receptacle from flexing and bulging under the compaction pressure is included to maintain the integrity of the receptacle. This bracing, 106 in one embodiment, is widened when the machine's service door is opened to allow the user to easily remove a tight-fitting removable bin.

In an additional embodiment, the device may include certain handles that allow for the automated removal of the removable bin. The handle may include a bar or reinforcing ribs so that a mechanical hand can safely grab the removable bin without breaking it or causing to flex inward to such a degree that the trash inside cannot be removed.

Another embodiment of the present invention provides for an animal-resistant device. As shown in Fig. 13, this embodiment incorporates a latch 104 that animals cannot operate, but that humans and handicapped humans can operate. The latch 104 prevents animals from entering the trash chambers. Additionally, this embodiment can include a controlling component that is programmed to monitor the photo-eye several times before engaging a compaction cycle, so that animal's movement can be detected. In the event that an animal gains access to the trash compartment, all wiring may be protected by metal or hard plastic to protect it from any damage that an animal may cause.

In another embodiment, a rolled bag-compartment is incorporated into the front panel of the device, and is designed to allow a roll of bags to be installed, such that a single bag can be pulled out easily. Also, a bag holder may be installed around the removable bin, so the bag is held in place and does not become pulled out of place by the ram's movement.

Another embodiment includes optimizing the feed-chamber so that the trash receiving area does not get Filled with very loose trash, causing the operator to have to run unnecessary cycles. In such an embodiment, an efficient "pre-crusher" procedure may be implemented that makes the best use of the trash receiving area by semi-compacting the load so the whole bin is used each time, reducing the number of cycles that must be run with the big motor. In this embodiment, the pre-crusher utilizes a separate motor to compact trash enough to fit into the charge box efficiently, such that the compaction ram is used minimally, only as needed to push trash into the compaction chamber. Alternatively the main compactor motor may be used to power the pre-crusher. In this embodiment, a set of hydraulic valves directs the motor's energy to a higher speed, lower power ram such that the main compaction ram pushed more dense material into the main compaction chamber.

The container may include drainage holes near the bottom to allow liquids in the trash to drain from the unit, to allow increased compaction of the remaining trash. An additional feature for cold weather locations includes a heating element to warm up the trash, thereby thawing any frozen liquids to allow them to drain. Further, many materials such as plastic are easier to compress at a higher temperature, so by heating the contents to the present invention can increase compaction efficiency. The heating element may be controlled so that it is only activated when the battery 36 is near full charge. Further, heating elements may be placed above, beneath or within the PV array, in order to melt snow or ice that is covering the PV array. In warmer climates, a shallow drainage basin may be used to facilitate evaporation of liquids. Sensors can detect moisture, temperature, or a lack of light reaching the PV array and activate the snow melting heating elements, or may initiate fans to evaporate liquids in the drainage basin.

Another embodiment of the present invention includes using two or more similar bins for trash storage, for the purpose of separating recyclable materials and to reduce the weight and volume of each bin, reducing the chance of worker injury, and enabling the use of smaller, more standardized garbage bags.

The container may include mounting clips on the exterior to allow advertisement placards to be placed on the outside of the containers. Other features include wired or wireless communications equipment installed with the container. Radio signals may be transmitted by the container when it is full and no more compaction is possible, or if the unit is broken or being vandalized. Further, the container can report on conditions including battery charge, cycle counts, etc. The container can also receive signals, including commands to immediately perform compaction cycles or to change cycle timing, etc. The containers may also report conditions by indicator lights 11 (see FIG. 3) which may indicate if the unit is full or malfunctioning. Such indicator lights 11 allow the containers to be inspected from a distance (such as through binoculars) to allow service personnel to determine whether it is necessary to make a service trip to the container.

It is possible to have two or more containers for trash storage, for the purpose of separating recyclable materials and to reduce the weight and volume of each bin, reducing the chance of worker injury, and enabling the use of smaller, more standardized garbage bags. The containers may have separate access ports to allow people to sort and place different types of items into different containers. For example, one container could have paper products while others have cans. Such a device according to the present invention could then compact the contents in each internal container separately (using individual compaction rams or one compaction ram which the containers are mechanically shifted to), or all at once using one large compaction ram 24 that spans all the containers. Alternatively, each container may have various types of crushers or shredders suited for each type of material. If different compaction rams are used for each internal container, then the device could compact only the containers that were full. Further, since different materials have different compacting characteristics (for example, crumpled paper compresses much easier than metal cans), the compacting mechanism size, shape, force, method and cycle duration can be optimized for a particular type of material.

Although solar power is disclosed as a source of power for the present invention, other sources of power are within the scope of the invention. This includes windmill or waterwheel generators located proximate the container, or located at an optimal location for collecting power. Alternatively, a generator with a hand or foot crank may be positioned with the container, with instructions inviting users of the trash container to crank the handle or pedal several times to help store energy to compact their trash. For such generators, whether by windmill, waterwheel or human, alternative energy generation means and energy storage means may be used, for example pumping air into a pressure tank for driving a pneumatic motor, winding up a spring mechanism, or a pulley system to raise a very heavy compaction ram, which then compacts the trash by its own weight.

Although the invention has been shown and described with respect to illustrative embodiments thereof, various other changes, omissions and additions in the form and detail thereof may be made therein without departing from the spirit and scope of the invention.

The invention claimed is:

1. A storage container comprising:
   an enclosure;
   a photovoltaic panel located on an upper exterior surface of said enclosure, said photovoltaic panel positioned to be exposed to sunlight, to convert said received sunlight into electric power;
   a storage battery, electrically connected to said photovoltaic panel;
   a motor controller having a controlling component electrically connected to said storage battery, said controlling component to monitor and control compactions performed by said storage container, wherein said controlling component is configured to skip a compaction cycle when said storage battery is undercharged until an adequate charge has been attained, said motor is a central microprocessor;
   a compaction ram, located within said enclosure, said compaction ram positioned to travel along a preset path within said enclosure;
   a driving mechanism located within said enclosure and electrically connected to said controlling component, wherein said driving mechanism is coupled to said compaction ram, said driving mechanism to use electric power from said storage battery to move said compaction ram along said preset path within said enclosure; and an access door, located on said enclosure, said access door to allow user access within said enclosure;

wherein items introduced into said enclosure by said access door settle into at least one bin, and wherein when said compaction ram travels along said preset path within said enclosure, said compaction ram compresses said items within said at least one bin, and said compaction ram travels within at least a part of said at least one bin.

2. The storage container of claim 1, wherein said at least one bin includes a handle to allow removal of said bin.

3. The storage container of claim 1 wherein said controlling component is programmed to engage an actuator to lock said access door.

4. The storage container of claim 1 further comprising:
at least one electrical contact said at least one electrical contact providing an electronic coupling from a first storage container to a second storage container.

5. The storage container of claim 1 wherein said driving mechanism further comprises a variable speed transmission.

6. The storage container of claim 1 further comprising an accelerometer affixed to said storage container.

7. The storage container of claim 1 further comprising a tracking system.

8. The storage container of claim 1 further comprising at least one perforator disposed between said access door and said at least one bin, said perforator operatively coupled to said driving mechanism.

9. The storage container of claim 8, wherein said at least one bin comprises a plurality of bins and said storage container further comprises a diversion mechanism, said diversion mechanism directing said items introduced into said enclosure into each of said plurality of bins.

10. The storage container of claim 8 further comprising a protective labyrinth, said protective labyrinth disposed between said access door and said at least one perforator.

11. The storage container of claim 1 further comprising an animal-resistant latch operatively attached to said access door.

12. The storage container of claim 1 wherein said access door is coated with an anti-stick material.

13. The storage container of claim 1 wherein said photovoltaic panel is placed between layers of foam.

14. The storage container of claim 1 wherein said photovoltaic panel is covered by a protective coating.

15. The storage container of claim 1 wherein said photovoltaic panel and a footprint of said storage container have substantially a 1:1 ratio.

16. The storage container of claim 1 wherein said enclosure further comprises bracing to prevent said bin from flexing or bulging under compaction pressure.

17. The storage container of claim 1 wherein said controlling component regulates voltage and current.

18. The storage container of claim 1 wherein said controlling component switches from a hydraulic accumulator energy storage to said storage battery.

19. The storage container of claim 1 further comprising a plurality of hold-downs, said plurality of hold-downs pivotally attached within said enclosure, said hold-downs pivoting to allow compaction ram to travel on said pre-set path.

20. The storage container of claim 1 further comprising a counter-weight, said counter-weight disposed at an end of said compaction ram.

21. The storage container of claim 1 wherein said controlling component reduces clock speed when said compaction ram is stationary.

22. The storage container of claim 1 further comprising a plurality of indicator lights.

23. The storage container of claim 1 further comprising a visual sensor, said visual sensor determining a capacity of said bin.

24. The storage container of claim 23 wherein said visual sensor further comprises a mirror system.

25. The storage container of claim 1 wherein said controlling component powers a visual sensor when items are introduced into said enclosure.

26. The storage container of claim 1 wherein said controlling component is configured to disable unused circuits within said controlling component.

27. The storage container of claim 1 wherein said controlling component regulates a battery charger, said battery charger disabled when solar power is insufficient enough to charge said storage battery.

28. The storage container of claim 1 further comprising a blocking diode, said blocking diode regulating a current flow from said storage battery to a battery charger.

29. The storage container of claim 1 wherein said controlling component disengages energy draw when an operating voltage output from said photovoltaic panel or storage battery is below a threshold.

30. The storage container of claim 1 wherein said controlling component selects said photovoltaic panel or said storage battery as a source of energy.

31. The storage container of claim 1 wherein said controlling component recharges an energy storage system through an electrical contact to another storage container, said energy storage system comprising said photovoltaic panel and said storage battery.

32. The storage container of claim 1 wherein said controlling component monitors and tracks operation voltage.

33. The storage container of claim 1 wherein said controlling component controls pressure settings of said compacting ram.

34. The storage container of claim 1 wherein said controlling component monitors relative current values.

35. The storage container of claim 1 further comprising an energy generator, said energy generator driven by movement of said access door.

36. The storage container of claim 35 wherein said energy generator comprises a piezoelectric element.

37. The storage container of claim 36 wherein said energy generator comprises a flywheel.

38. The storage container of claim 1 wherein said controlling component engages a relay activating a wireless transmitter, said wireless transmitter activated by said controlling component to transmit and receive a signal.

39. The storage container of claim 1 wherein said controlling component engages a relay to activate an explosive detector.

40. The storage container of claim 1 wherein said controlling component engages a relay to activate an odor reducing device.

41. The storage container of claim 1 wherein said at least one bin defines a drainage hole.

42. The storage container of claim 1 further comprising: an information panel affixed to said enclosure.

43. The storage container of claim 42 wherein said information panel is a lighted sign.

44. The storage container of claim 42 wherein said information panel is a scrolling panel.

45. A solar powered trash compactor comprising:
an enclosure;
a photovoltaic panel located on an angled upper exterior surface of said enclosure, said photovoltaic panel positioned to be exposed to sunlight, to convert said received sunlight into electric power;
a storage battery, located within said enclosure and electrically connected to said photovoltaic panel;
a motor controller having a controlling component electrically connected to said storage battery, to monitor and control compactions, wherein said controlling component is configured to skip a compaction cycle when said storage battery is undercharged until an adequate charge has been attained, said motor controller is a central microprocessor;
an electric motor located within said enclosure and electrically connected to said controlling component, said electric motor connected to a chain drive mechanism, said chain drive mechanism also connected to a compaction ram, wherein said compaction ram, when moved by said chain drive mechanism, moves along a preset path within said enclosure;
a bin, located within said enclosure, wherein items introduced into said enclosure by an access door settle into said bin, said bin positioned within said enclosure so that when said compaction ram travels along said preset path within said enclosure, said compaction ram travels within at least a part of said bin and compresses items within said bin; and
a bin access door, located on said enclosure, to allow insertion and removal of said bin from said enclosure.

46. The storage container of claim 1, wherein said controlling component receives signals from a photoelectric sensor, providing an indication that said bin is full of items.

47. The solar trash compactor of claim 45, wherein said controlling component receives signals from a photoelectric sensor, providing an indication that said bin is full of items.

48. A storage container comprising:
an enclosure;
a photovoltaic panel located on an upper exterior surface of said enclosure, said photovoltaic panel positioned to be exposed to sunlight, to convert said received sunlight into electric power;
a storage battery, located within said enclosure and electrically connected to said photovoltaic panel;
a motor controller having a controlling component electrically connected to said storage battery, said controlling component to monitor and control compactions performed by said storage container, wherein said controlling component is configured to skip a compaction cycle when said storage battery is undercharged until an adequate charge has been attained, said motor controller is a central microprocessor;
a compaction ram, located within said enclosure, said compaction ram positioned to travel along a preset path within said enclosure;
a driving mechanism located within said enclosure and electrically connected to said controlling component, wherein said driving mechanism is coupled to said compaction ram, said driving mechanism to use electric power from said storage battery to move said compaction ram along said preset path within said enclosure; and
at least one access door, located on said enclosure, said at least one access door to allow user access within said enclosure;
at least one protective chute coupled to said at least one access door wherein items introduced into said enclosure by said access door travel down said protective chute; and
at least one perforator disposed between said at least one protective chute and at least one bin, said at least one perforator operatively coupled to said driving mechanism;
wherein items introduced into said enclosure by said at least one access door travel through said at least one perforator and settle into said at least one bin, and wherein when said compaction ram travels along said preset path within said enclosure, said compaction ram compresses said items within said at least one bin, and said compaction ram travels within at least a part of said at least one bin.

49. The storage container of claim 48, wherein said at least one bin comprises a plurality of bins and said storage container further comprises a diversion mechanism, said diversion mechanism directing said items introduced into said enclosure into each of said plurality of bins.

50. The storage container of claim 48 further comprising: a protective labyrinth, said protective labyrinth disposed between said access door and said at least one perforator preventing said user's access to said perforator.

51. A storage container comprising:
an enclosure;
a compaction ram positioned in said enclosure;
a photovoltaic panel positioned on said enclosure to be exposed to sunlight;
a storage battery, electrically connected to said photovoltaic panel; and
a motor controller, electrically connected to said storage battery, said motor controller configured to control compaction cycles of the compaction ram in said storage container, wherein said motor controller is configured to skip said cycles when said storage battery is undercharged until an adequate charge of said storage battery has been attained, said motor controller is a central microprocessor.

* * * * *